United States Patent [19]

Hoelsher et al.

[11] Patent Number: 5,083,031

[45] Date of Patent: * Jan. 21, 1992

[54] RADIATION DOSIMETERS

[75] Inventors: James W. Hoelsher; Joel E. Hegland; Peter F. Braunlich; Wolfgang Tetzlaff, all of Pullman, Wash.

[73] Assignee: International Sensor Technology, Inc., Pullman, Wash.

[*] Notice: The portion of the term of this patent subsequent to Apr. 25, 2006 has been disclaimed.

[21] Appl. No.: 343,000

[22] Filed: Apr. 24, 1989

Related U.S. Application Data

[63] Continuation-in-part of Ser. No. 897,992, Aug. 19, 1986, Pat. No. 4,825,084, and a continuation-in-part of Ser. No. 882,953, Jul. 7, 1986, Pat. No. 4,839,518, which is a continuation-in-part of Ser. No. 652,829, Sep. 20, 1984, Pat. No. 4,638,163, which is a continuation-in-part of Ser. No. 336,015, Apr. 10, 1989, Pat. No. 5,015,855.

[51] Int. Cl.$^5$ .................................................. G01T 1/11
[52] U.S. Cl. ............................... 250/484.1; 250/482.1; 250/486.1
[58] Field of Search ............... 250/484.1 A, 484.1 C, 250/337, 482.1, 486.1, 475.1

[56] References Cited

U.S. PATENT DOCUMENTS

| | | | |
|---|---|---|---|
| 2,730,625 | 1/1956 | Shurcliff | 250/484.1 C |
| 2,852,691 | 9/1958 | Land | 250/475.2 |
| 2,855,519 | 10/1958 | Kocher | 250/482.1 |
| 3,100,262 | 8/1963 | Shenker et al. | 250/484.1 C |
| 3,426,197 | 2/1969 | Waly et al. | 250/484.1 C |
| 3,564,244 | 2/1971 | Schayes et al. | 250/484.1 A |
| 3,567,934 | 3/1971 | Clarke | 250/482.1 |
| 3,761,710 | 9/1973 | Yamashita et al. | 250/484.1 A |
| 4,465,936 | 8/1984 | Ishiguru et al. | 250/486.1 |
| 4,492,872 | 1/1985 | Burgkhart et al. | 250/486.1 |
| 4,510,174 | 4/1985 | Holzapfel et al. | 250/484.1 A |
| 4,636,642 | 1/1987 | Simons et al. | 250/484.1 A |

FOREIGN PATENT DOCUMENTS

| | | | |
|---|---|---|---|
| 210787 | 10/1985 | Japan | 250/484.1 A |
| 1269100 | 11/1986 | Japan | 250/484.1 A |
| 18285 | 1/1988 | Japan | 250/484.1 A |
| 8805923 | 8/1988 | PCT Int'l Appl. | 250/370.07 |

Primary Examiner—Carolyn E. Fields
Attorney, Agent, or Firm—Wells, St. John & Roberts

[57] ABSTRACT

Radiation dosimeters and dosimeter badges. The dosimeter badges include first and second parts which are connected to join using a securement to produce a sealed area in which at least one dosimeter is held and protected. The badge parts are separated to expose the dosimeters to a stimulating laser beam used to read dose exposure information therefrom. The badge is constructed to allow automated disassembly and reassembly in a uniquely fitting relationship. An electronic memory is included to provide calibration and identification information used during reading of the dosimeter. Dosimeter mounts which reduce thermal heating requirements are shown. Dosimeter constructions and production methods using thin substrates and phosphor binder-layers applied thereto are also taught.

54 Claims, 24 Drawing Sheets

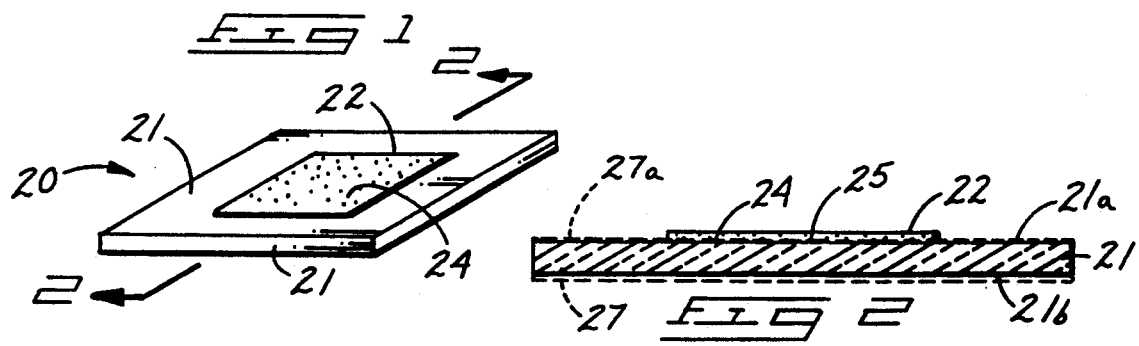
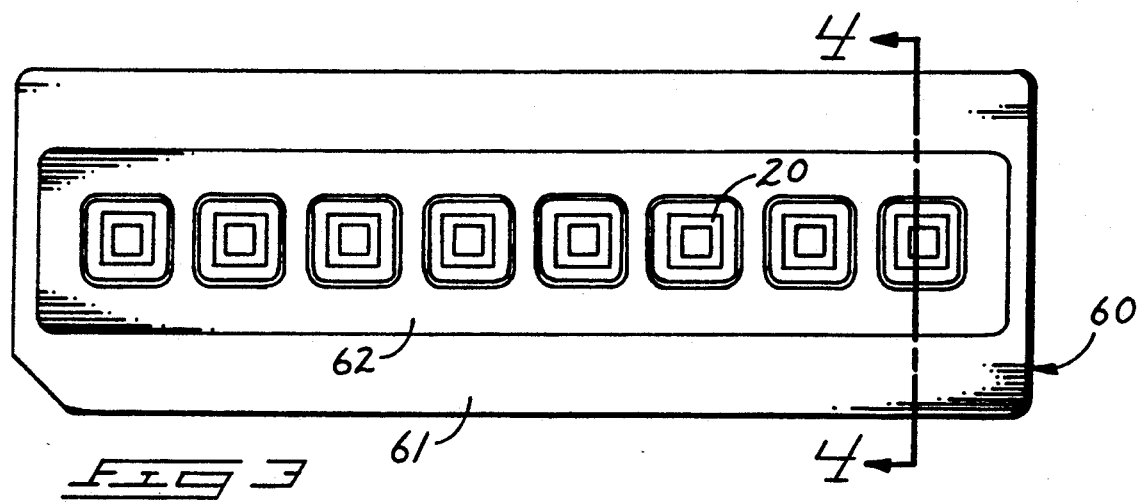
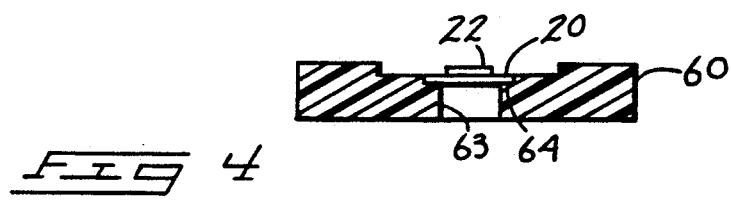
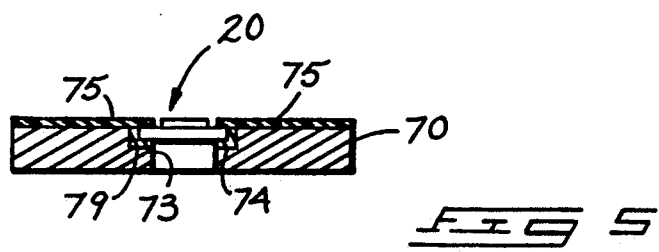
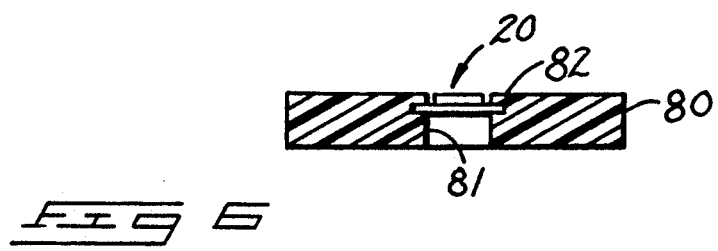

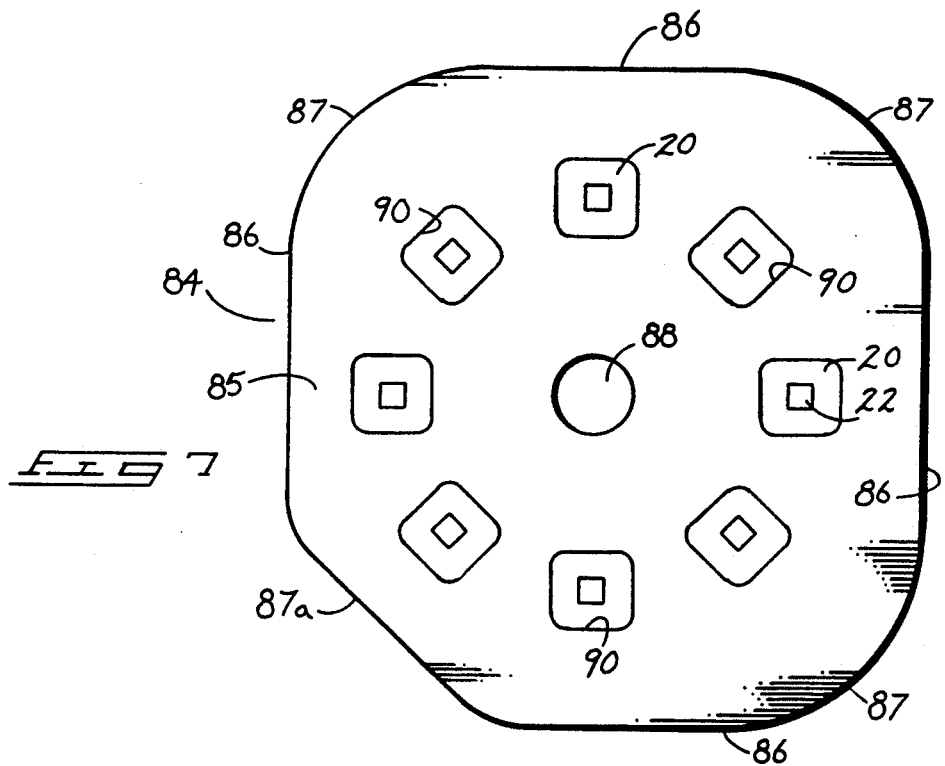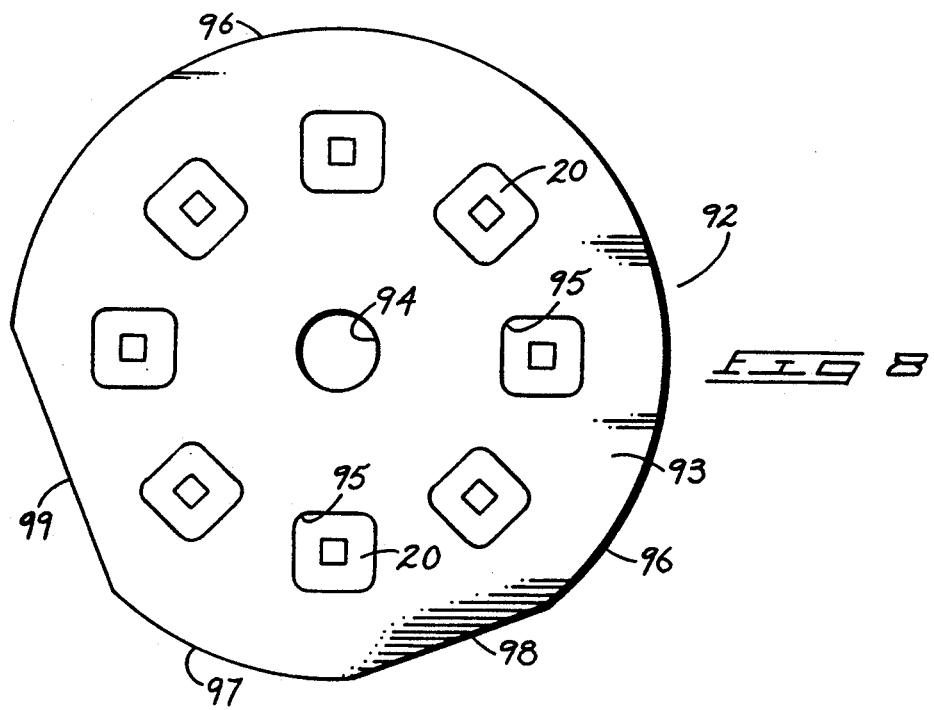

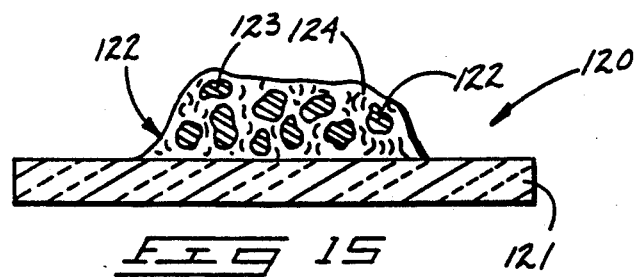
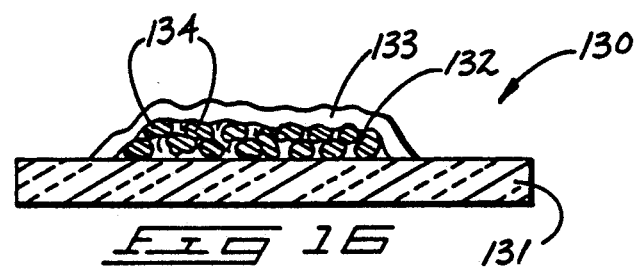
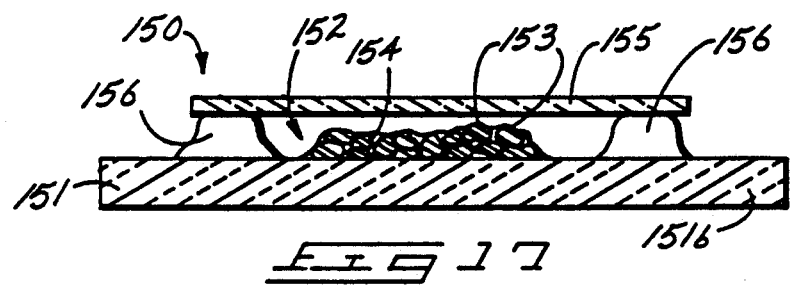
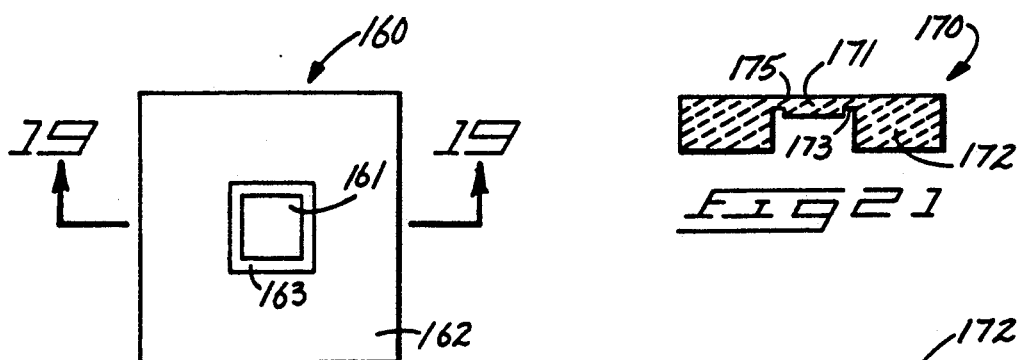
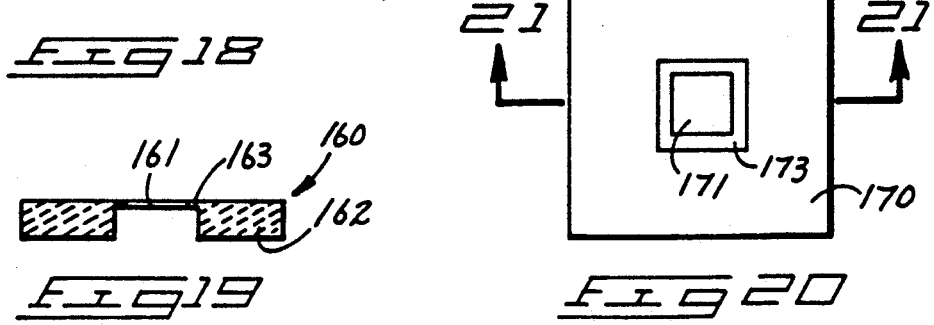

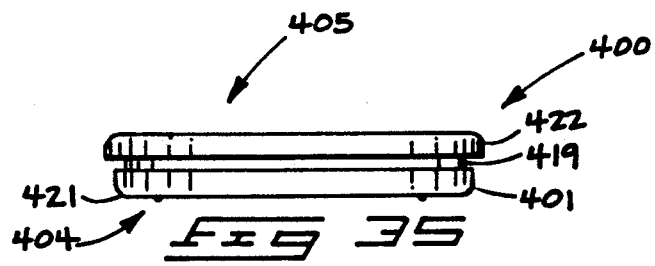
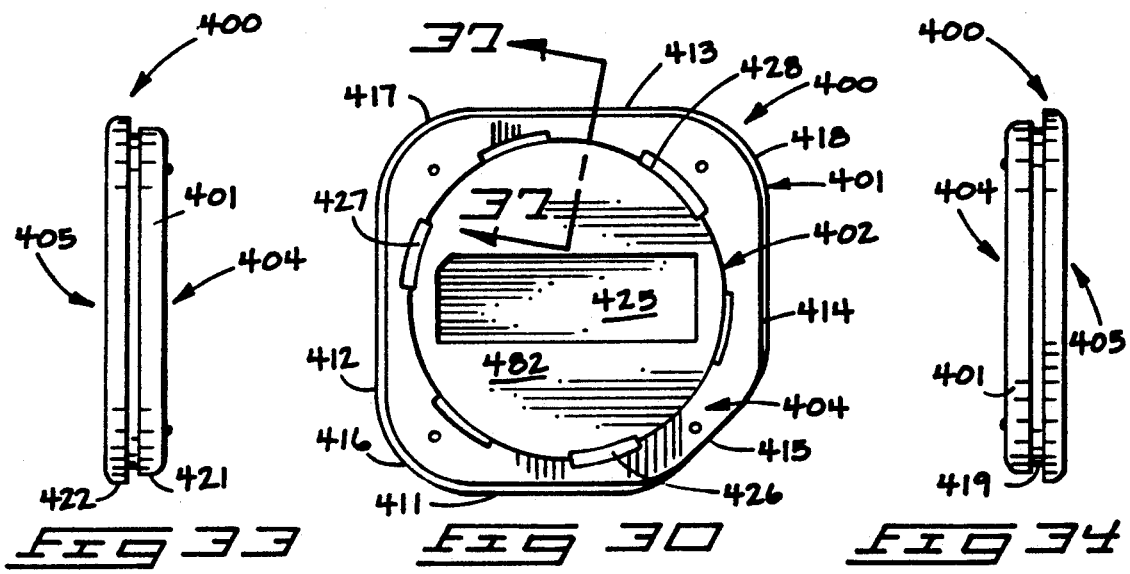
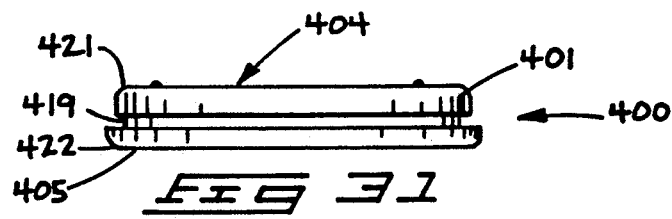
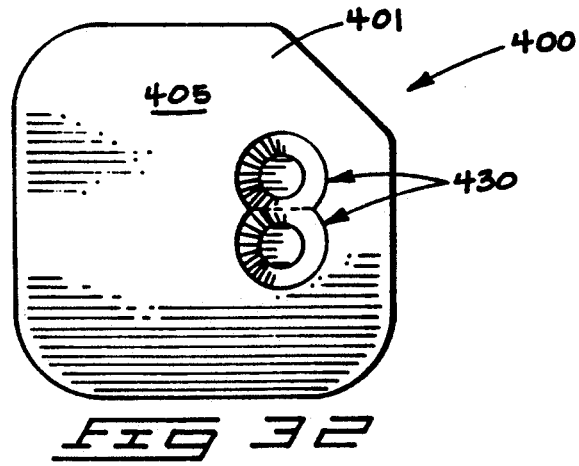

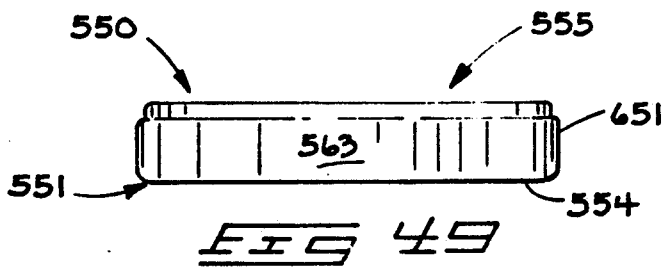
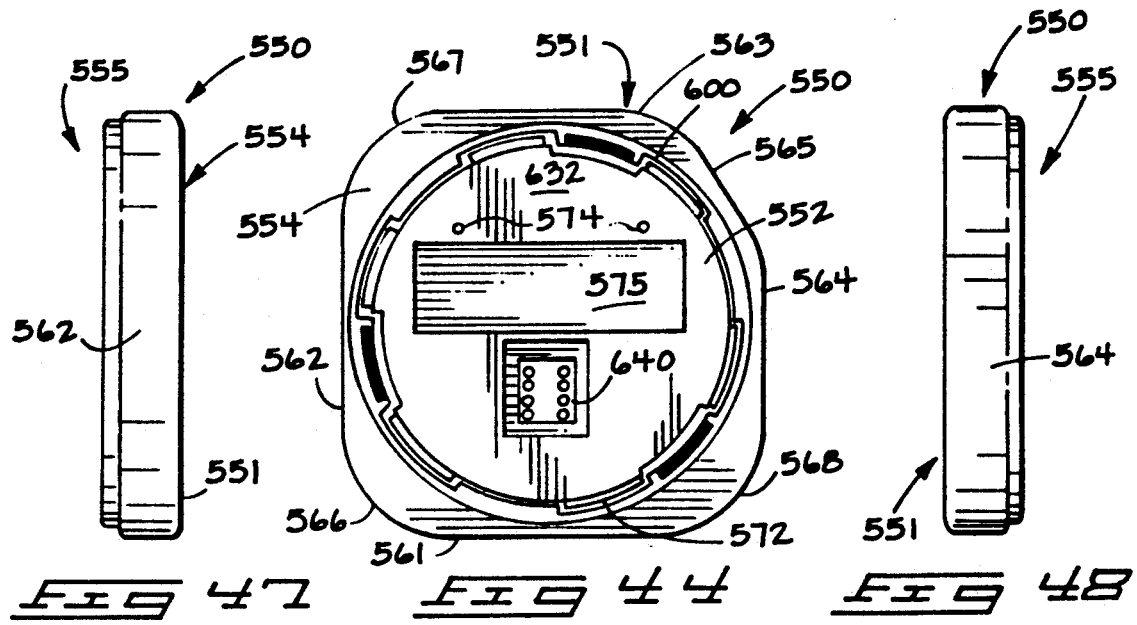
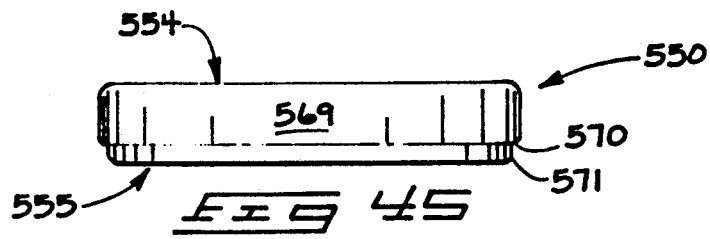
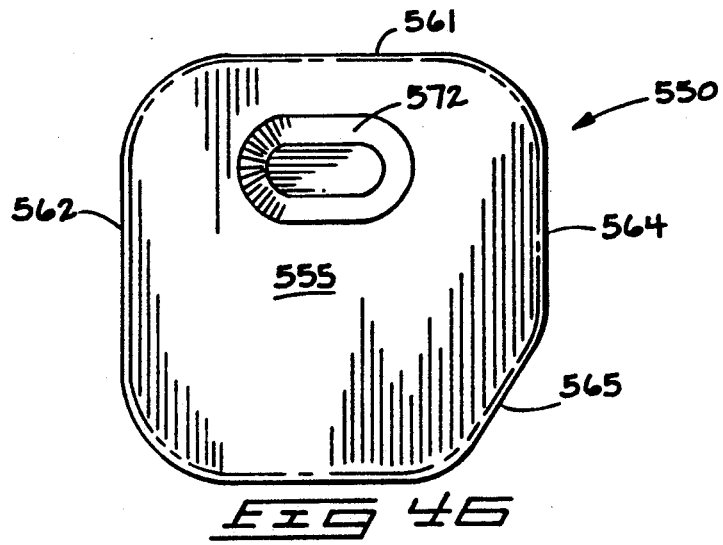

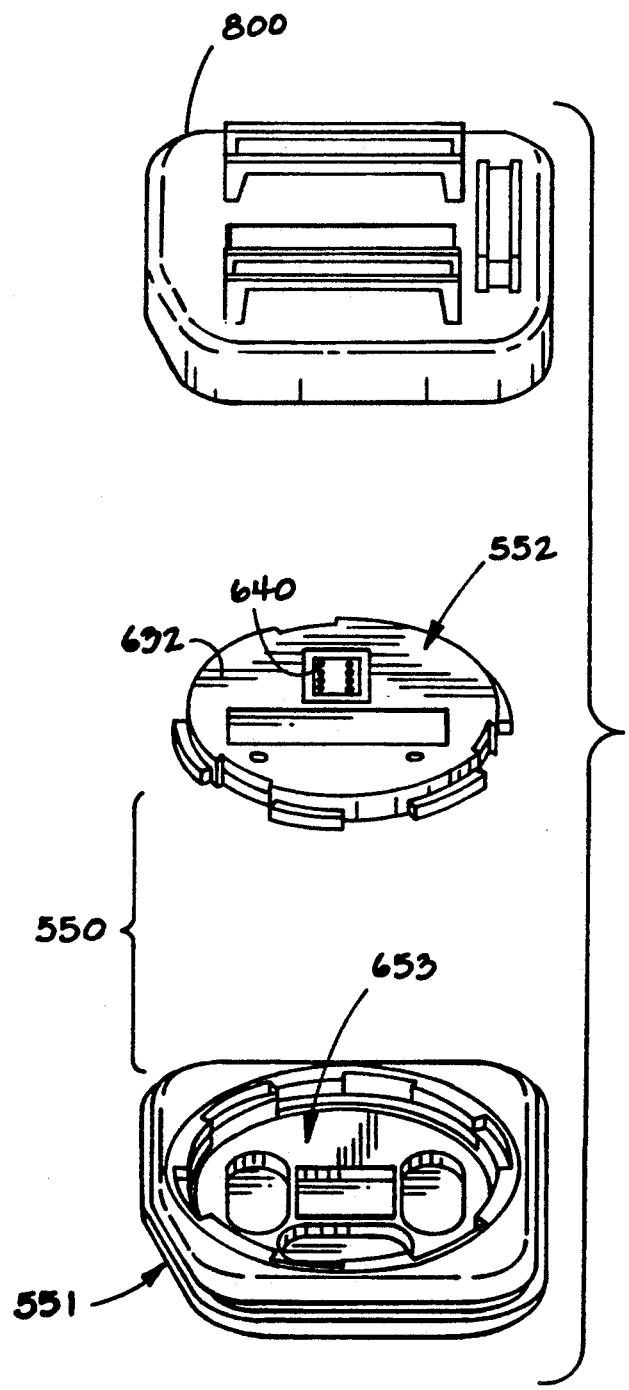

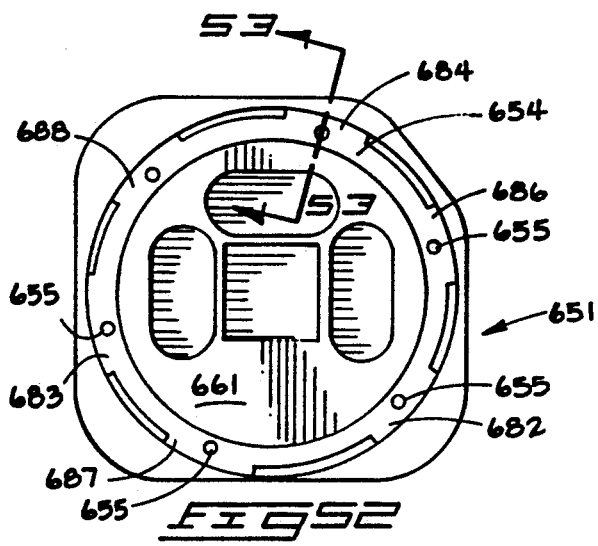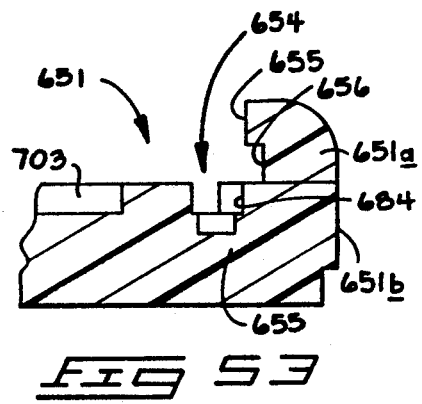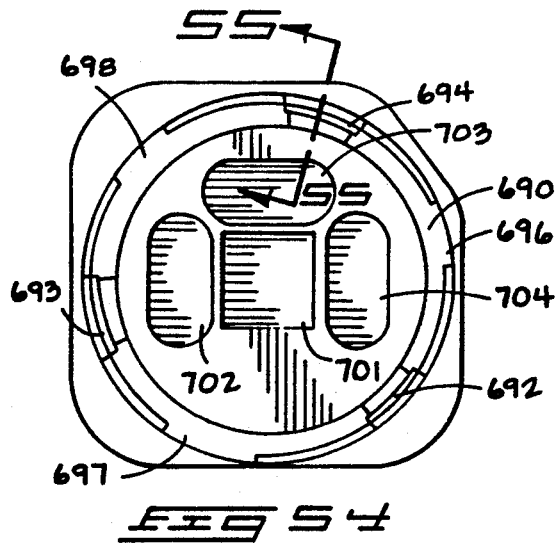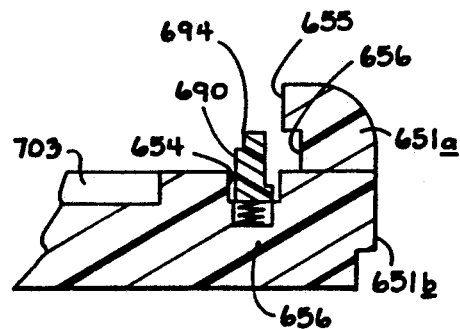

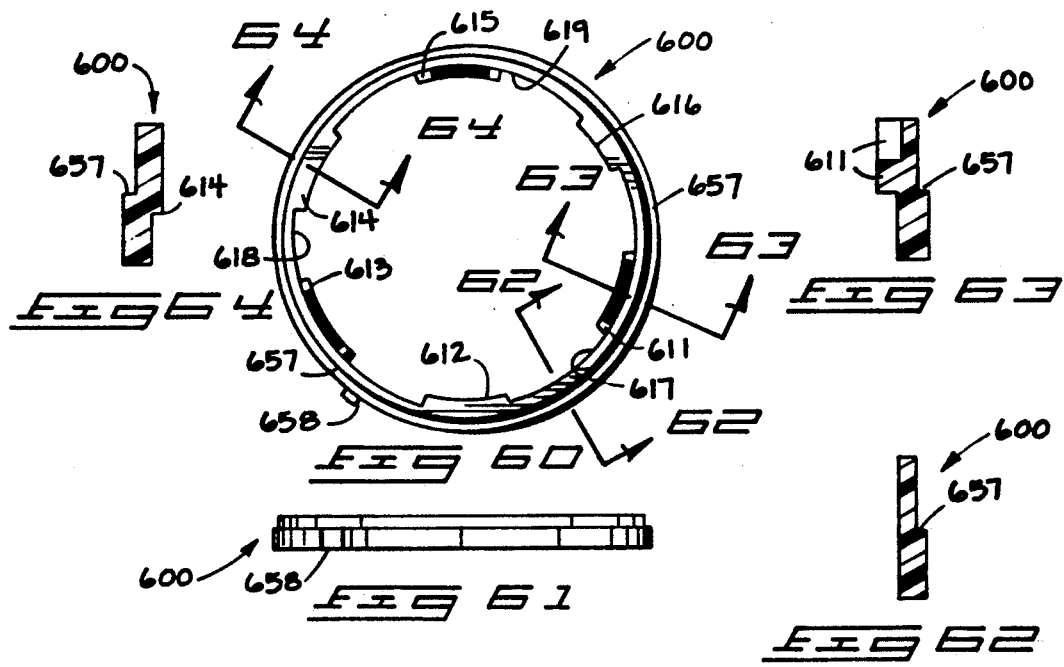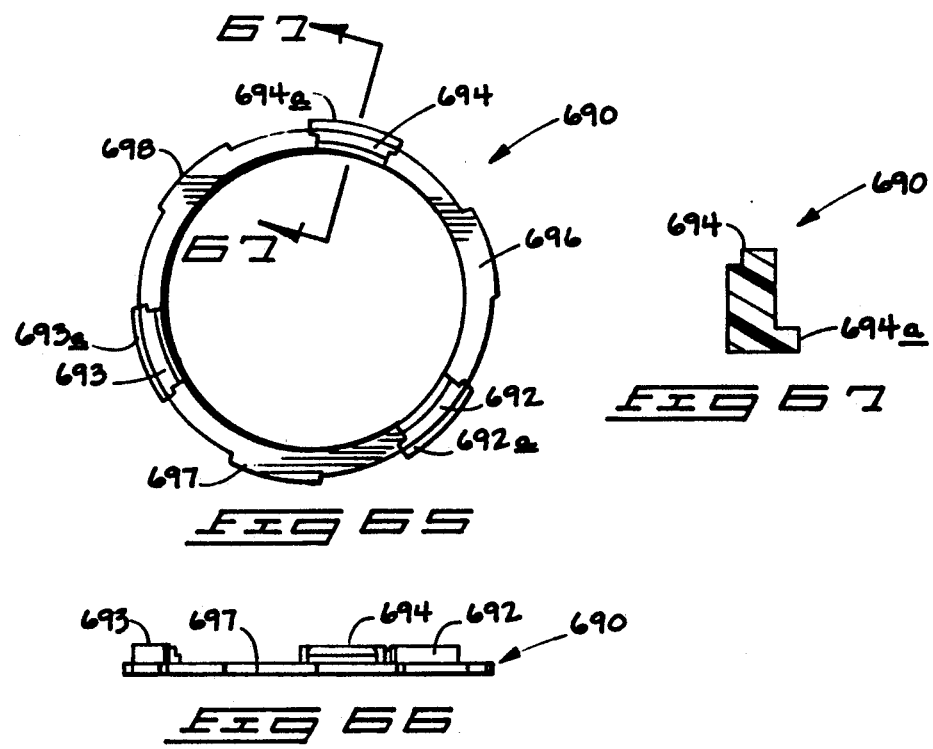

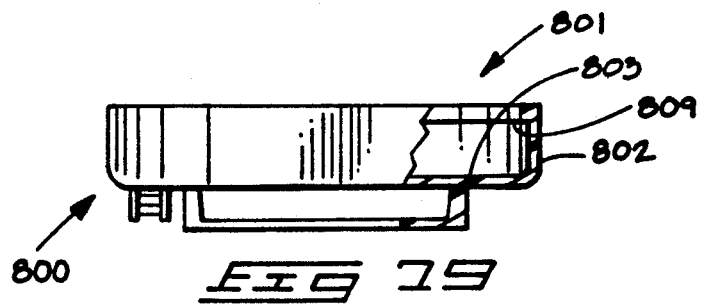
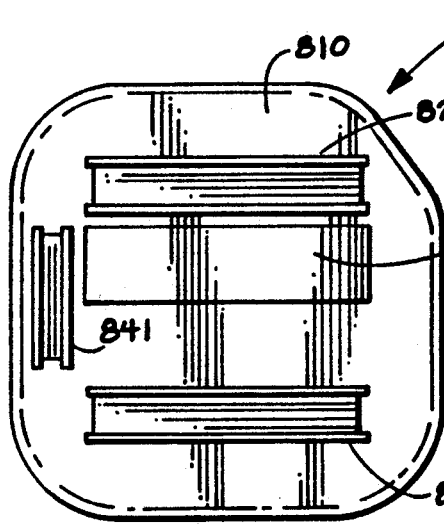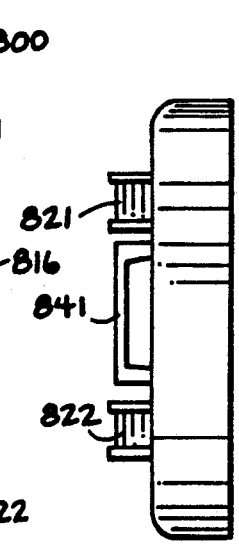
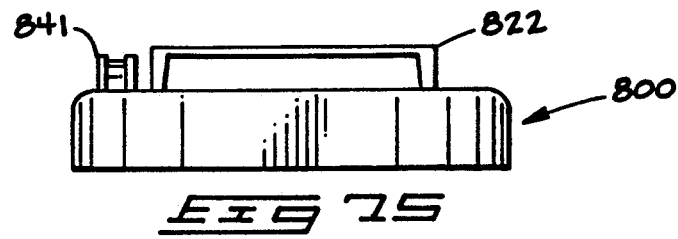
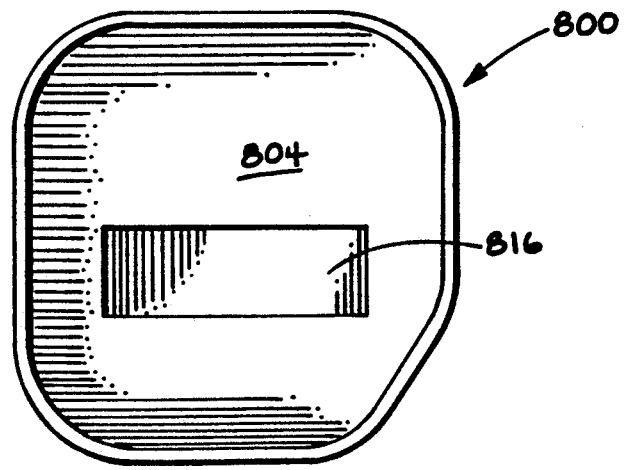

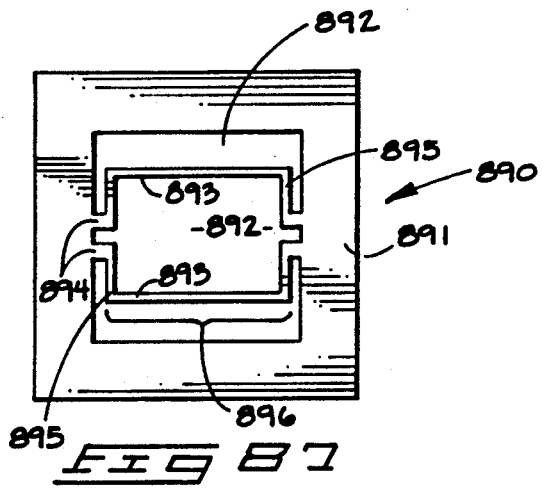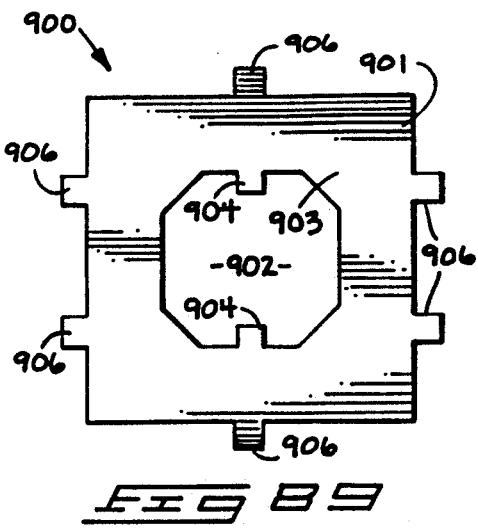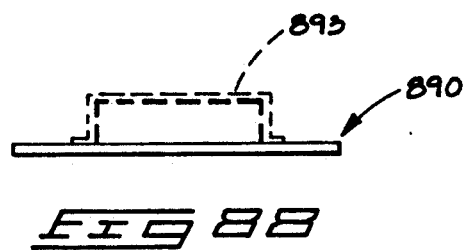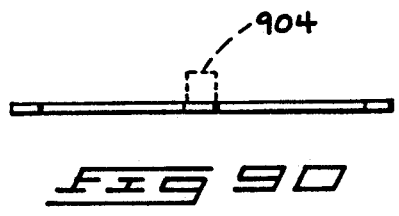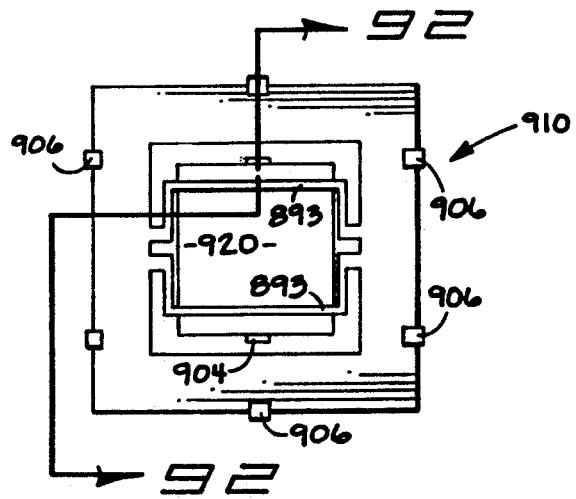

RADIATION DOSIMETERS

This invention was made with government support under Contract No. N60921-88-C-0085, awarded by the U.S. Department of Defense; and under Contact No. DE-AC03-84ER80165, awarded by the U.S. Department of Energy. The government has certain rights in this invention.

CROSS-REFERENCE TO RELATED APPLICATIONS

This is a continuation-in-part of copending, allowed U.S. pat. application Ser. No. 897,992 filed Aug. 19, 1986, U.S. Pat. No. 4,825,084, which is incorporated hereinto by reference in its entirety as if set forth in full.

This application is also a continuation-in-part of allowed U.S. patent application Ser. No. 882,953, entitled "Apparatuses and Methods for Laser Reading of Thermoluminescent Phosphors", filed July 7, 1986, now U.S. Pat. No. 4,839,518, which was a continutation-in-part of U.S. patent application Ser. No. 652,829, filed Sept. 20, 1984 now U.S. Pat. No. 4,638,163, issued Jan. 20, 1987. Such application and patent are hereby incorporated hereinto by reference in their entirety as if set forth in full.

This application is further a continuation-in-part of copending U.S. patent application Ser. No. 336,015, entitled "Radiation Dosimetry By Counting Differentially Ionized Sample Areas From Heavy Charged Particle Events", filed Apr. 10, 1989, now U.S. Pat. No. 5,015,855. Such application is hereby incorported hereinto by reference in its entirety as if set forth in full.

TECHNICAL FIELD

The technical field of this invention is radiation dosimeters, radiation dosimetry badges and mountings, and methods for fabricating radiation dosimeters.

BACKGROUND OF THE INVENTION

It is well known in the art that certain materials called luminescent phosphors, such as thermoluminescent phosphors, can be irradiated with high energy radiation, and then subsequently stimulated, in the case of thermoluminescent phosphors using heat, to produce a luminescent emission. Thermoluminescent phosphors are currently in widespread use in radiation dosimeters used to measure the amount of incident radiation to which people, animals, plants and other things are exposed. Thermoluminescent dosimeters are widely used by workers in the nuclear industries to provide a constant monitor for measuring exposure to radiation.

Thermoluminescent phosphors are excited by energetic radiation such as ultraviolet, X-ray, gamma, and other forms of radiation. Such ionizing radiation causes electrons within the thermoluminescent material to become highly energized. The nature of thermoluminescent materials causes these high energy electrons to be trapped at relatively stable higher energy levels. The electrons stay at these higher energy levels until additional energy, usually in the form of heat, is supplied which releases the trapped electrons, thereby allowing them to fall back to a lower energy state. The return of the electrons to a lower energy state causes a release of energy primarily in the form of visible light which is ordinarily termed a luminescent emission.

The use of thermoluminescent phosphors in personal dosimeters has led to demand for a large number of dosimeters which must be read on a routine basis in order to monitor exposure of persons or other objects to ionizing radiation. Because of the substantial numbers and the relatively slow reading techniques currently employed, the job of reading dosimeters becomes very time consuming and costly.

There are four commonly known methods of heating thermoluminescent material in order to release the trapped electrons and provide the luminescent emission which is measured as an indication of the amount of ionizing radiation to which the dosimeter was exposed. The first and most common method for heating thermoluminescent phosphors is by contact heating. The second method is heating using a hot gas stream which is impinged upon the phosphor. The third method uses radiant energy in the form of infrared beams which heat the thermoluminescent phosphor. The fourth method uses infrared laser beams to provide the necessary heat for luminescent emission.

Novel methods and apparatuses for laser reading of thermoluminescent phosphor dosimeters are disclosed in detail in U.S. Pat. No. 4,638,163 incorporated by reference hereinabove. One of the inventors of this invention and his colleagues have developed laser reading techniques and dosimeters, as disclosed in an article entitled "Laser Heating In Thermoluminescence Dosimetry," by J. Gasiot, P. Braunlich, and J. P. Fillard, *Journal of Applied Physics*, Vol. 53, No. 7, July 1982. In that article, the authors describe how thin layers of thermoluminescent phosphors can be precipitated onto glass microscope cover slides and used as laser readable dosimetes. Powder layers of the phosphors were in some cases coated with a thin film of high temperature polymers. The content of said article is hereby incorporated hereinto by reference.

Laser heating of thermoluminescent phosphors is superior because of the greatly decreased heating times and associated increased processing rates which are possible. Release of stored luminescent energy within a short period of time greatly improves signal-to-noise ratios and thus the accuracy of dosimeter measurements.

The benefits of laser heating for thermoluminescent phosphors has not been fully realized because of difficulties associated with laser heating of prior art dosimeters. Relatively thick layers of thermoluminescent phosphors (1 mm) can be heated using lasers, but necessarily require longer heating times because of the larger mass of phosphor which must be heated. Higher laser power levels can theoretically be used but at higher cost. Thick layer dosimeters further suffer from problems of prolonged heating at the heat generated in the phosphor diffuses outwardly from the area of last impingement. This reduces the accuracy of the measurements. Thermal gradients developed within the phosphor layer can also lead to degradation of the phosphor layer when high power levels are used to produce high heating rates.

Thermoluminescent phosphor radiation detectors have been commercially available as crystals, hotpressed or extruded elements, powder embedded into a Teflon matrix, phosphor particles in glass capillaries, and in thin layers upon metal or plastic foil in surface concentrations of about 20 milligrams per square centimeter, E. Piesch, "Application of TLD to Personal Dosimetry," *Applied Thermoluminescence Dosimetry*, Editors M. Oberhofer and A. Scharmann, 1981, which is hereby incorporated hereinto by reference. The Piesch article also states that ultra-thin bonded discs of lithium fluoride (LiF) in a Teflon matrix have been bonded to thick Teflon bases. The article further states that such dosimeters use approximately 6 milligrams of phosphor per square centimeter. Such dosimeters are unfortunately also light sensitive and produce their own luminescent output. They are unable to withstand the approximately 300°-400° C. or higher temperatures which must be used to deep anneal dosimeters after many prior exposure and read cycles. Many other plastic and organic material based dosimeter configurations also suffer from these problems of temperature and light stimulated luminescent output. Prior art plastic substrate and/or matrix dosimeters also are unacceptable for laser heating because of the localized high temperatures developed at the point of laser impingement which lead to degradation of the plastic. Other organic materials also typically suffer from these limitations.

In addition to theremoluminescent phosphors there are other types of luminescent phosphors which are also measurable by using similar approaches. The requirements of reading theremoluminescent phosphors are particulary difficult because of the large amounts of heat generated. In general the dosimeter constructions shown herein are directed to overcoming the heat induced problems. However, many of the features of the novel dosimeters and badge designs can be employed in the production of other types of ionizing radiation dosimeters using a variety of phosphor types which are stimulated using heat or using direct optical laser stimulation, such as described in U.S. Pat. No. 4,507,562 "Method for Rapidly Stimulating Luminescent Phosphors and Recovering Information Therefrom", issued Mar. 26, 1985 which is incorporated by reference hereinto.

U.S. Pat. No. 4,510,174 to Holzapfel et al. discloses a method for manufacturing thin layer dosimeters. The method involves hot-pressing a thermoluminescent phosphor deposited on a substrate. The substrate must have a suitably prepared surface. The hot-pressing causes plastic flow of the phosphor to occur, bonding the phosphor to the substrate. The Holzapfel invention is disadvantageous in that it does not work well, if at all, with $CaSO_4$, BeO, and $Al_2O_3$ because these materials are hard and not subject to easy plastic flow at reasonable temperatures and pressures. The Holzapfel invention also is disadvantageous because the thickness of phosphor that must be heated is greater than what is required. The substrates used by Holzapfel are good for contact heating but are not good in laser heating because of their high conductivity. Thermal expansion rate mismatch is also a potential problem with laser heating of the Holzapfel dosimeters.

U.S. Pat. No. 3,894,238 to Cox et al teaches a laminated dosimetric card including thermoluminescent dosimeters sealed in an envelope of polyolefin, fluorinated ethylene propylene polymers, or PTFE. The dosimeters use a crystal or chip of phosphor or a quantity of powder. Such dosimeters cannot be deep annealed or heated using a laser reading apparatus, because of temperature limitations as explained above.

A manganese activated phosphate glass useful in radiation dosimetry is taught in U.S. Pat. No. 3,899,679 to Regulla. Regulla uses a phosphate glass which is doped with manganeses in concentrations from 0.1% to in excess of 10%, along with dysprosium. Addition dopants disclosed by Regulla include cerium and silver. U.S. Pat. Nos. 3,294,700 to Bedier et al, and 3,463,664 to Yokota et al disclose other phosphate glasses uesful as dosimeters. U.S. Pat. No. 3,255,120 to Cohen teaches a further thermoluminescent glass.

It is an object of this invention to provide thin layer radiation dosimeters which can be very rapidly read, preferably using laser beams in a manner that allows reliable measurement of the resulting luminescent emissions.

It is another object of this invention to provide methods by which thin layer luminescent radiation dosimeters can be fabricated.

It is another object of this invention to provide improved dosimeter holders and badges useful in connection with the novel dosimeters.

These and other objects and advantages of this invention will be apparent from the description given herein.

BRIEF DESCRIPTION OF THE DRAWINGS

Preferred embodiments of the invention are illustrated in the accompanying drawings which are briefly described as follows.

FIG. 1 is a perspective view of a preferred dosimeter according to this invention.

FIG. 2 is an enlarged side sectional view of the dosimeter of FIG. 1.

FIG. 3 is plan view of an alternative embodiment dosimeter of this invention having a frame and a plurality of individual dosimeter inserts.

FIG. 4 is a sectional view taken along line 4—4 of FIG. 3.

FIG. 5 is an sectional view of an alternative configuration similar to FIG. 4.

FIG. 6 is another sectional view of another alternative configuration similar to FIG. 4.

FIG. 7 is a plan view of another dosimeter of this invention having a frame.

FIG. 8 is a plan view of still another dosimeter according to this invention.

FIGS. 15 shows a cross-sectional view of a dosimeter having a protective and moisture resistant construction according to this invention.

FIGS. 16 shows a cross-sectional view of an alternative dosimeter having moisture and gas resistance.

FIG. 17 shows a cross-sectional view of a still further alternative dosimeter having a cover piece protecting the phosphor matrix layer of the dosimeter.

FIG. 18 is plan view of a still further embodiment dosimeter having a thermal insulation ring.

FIG. 19 is a cross-sectional view taken along line 19—19 of FIG. 18.

FIG. 20 is a plan view of a blank used to produce dosimeters such as shown in FIGS. 18 and 19.

FIG. 21 is a cross-sectional view taken along line 21—21 of FIG. 20.

FIG. 30 is a plan view showing the top surface of a further preferred dosimeter badge according to this invention.

FIG. 31 is a front edge view of the dosimeter of FIG. 30.

FIG. 32 is a plan view of the bottom face of the dosimeter shown in FIG. 30.

FIG. 33 is a left edge view of the dosimeter badge shown in FIG. 30.

FIG. 34 is a right edge view of the dosimeter badge shown in FIG. 30.

FIG. 35 is a rear edge view of the dosimeter badge shown in FIG. 30.

FIG. 44 is a plan view showing the top surface of a further preferred dosimeter badge according to this invention.

FIG. 45 is a front edge view of the dosimeter of FIG. 44.

FIG. 46 is a plan view of the bottom face of the dosimeter shown in FIG. 44.

FIG. 47 is a left edge view of the dosimeter badge shown in FIG. 44.

FIG. 48 is a right edge veiw of the dosimeter badge shown in FIG. 44.

FIG. 49 is a rear edge view of the dosimeter badge shown in FIG. 44.

FIG. 51 shows an assembly view incorporating the dosimeter badge of FIG. 44 and further showing a badge holder.

FIG. 52 is a top plan view showing in isolation a case portion of the base assembly forming a part of the dosimeter badge of FIG. 44.

FIG. 53 is an enlarged partial sectional view taken along line 53—53 of FIG. 52.

FIG. 54 is a top plan veiw showing the case portion of the base presented in FIG. 52 with a tamper ring installed therein.

FIG. 55 is an enlarged partial sectional view taken along line 55—55 of FIG. 54.

FIG. 60 is a top plan view showing in isolation the tamper ring included in the dosimeter badge of FIG. 44.

FIG. 61 is an edge view of the locking ring shown in FIG. 60.

FIG. 62 is an enlarged sectional view taken along line 62—62 of FIG. 60.

FIG. 63 is an enlarged sectional view taken along line 63—63 of FIG. 60.

FIG. 64 is an enlarged sectional view taken along line 64—64 of FIG. 60.

FIG. 65 is a top plan view showing in isolation the tamper ring incorporated in the dosimeter badge of FIG. 44.

FIG. 66 is an edge view of the tamper ring shown in FIG. 65.

FIG. 67 is an sectional view taken along line 67—67 of FIG. 65.

FIG. 74 is a plan view of the back surface of a dosimeter badge holder according to this invention.

FIG. 75 is a front edge view of the dosimeter badge holder shown in FIG. 74.

FIG. 76 is an inside face plan view of the dosimeter badge holder of FIG. 74.

FIG. 77 is a left edge view of the dosimeter badge shown in FIG. 74.

FIG. 78 is a right edge view of the dosimeter badge holder of FIG. 74.

FIG. 79 is a rear edge view of the dosimeter badge holder of FIG. 74. Portions of FIG. 79 have been broken away and shown in cross-section for illustrative purposes.

FIG. 87 is a top plan view showing a further preferred dosimeter mounting retainer according to this invention.

FIG. 88 is a front edge view of the retainer shown in FIG. 87.

FIG. 89 is a top plan view showing a further dosimeter retainer made in accordance with this invention which is designed for use in conjunction with the retainer of FIG. 87.

FIG. 90 is a front edge view of the retainer shown in FIG. 89.

FIG. 91 is an assembly view showing the retainers of FIGS. 87 and 89 assembled together to hold a thermoluminesecent dosimeter chip.

DETAILED DESCRIPTION OF THE PREFERRED EMBODIMENTS

Figure 9:
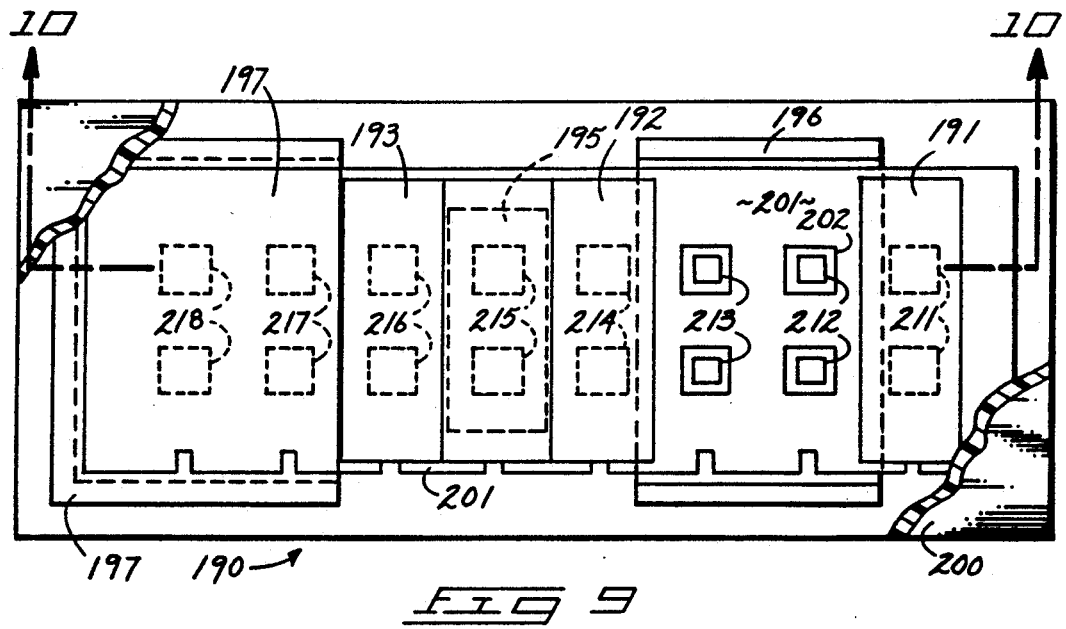
FIG. 9 is a top or plan view of another dosimeter of this invention having a case, filters, and a means for attaching the dosimeter. Portions of the case have been broken away to better show underlying components.

The following disclosure of the invention is submitted to further the constitutional purpose of the Patent Laws "to promote the progress of science and useful arts" (Article 1, Section 8).

FIG. 1 shows a preferred dosimeter 20 according to this invention. Dosimeter 20 includes a substrate 21 and a phosphor-matrix layer 22 connected to the substrate. FIG. 2 illustrates that phosphor-matrix layer 22 comprises particles or granules 24 and an interconnecting binder 25. The interconnecting binder or matrix 25 is bonded to substrate 21 and holds phosphor particles 24 in position thereon. Binder matrix 25 also typically forms bonds with the thermoluminescent phosphor particles thereby providing a solid, two-part layer bonded to substrate 21.

Substrate 21 can be made from a variety of materials. Transparent glasses have been found advantageous. Certain high temperature polymers, such as described below have also been found very advantageous when used in the novel dosimeter constructions described hereinafter. An example of a preferred type of glass is Corning Type 0211 which is a potash, soda, zinc, titania, alkali-zinc borosilicate glass, Corning Glass Works, Corning, N.Y. 14830. Type 0211 has a softening point of 720° C. (1328° F.) at $10^{7.6}$ posies and a coefficient of thermal expansion equal to $73.8 \times 10^{-7}/°C$. Glasses or other materials containing heavy metals such as lead may not be desirable because of attenuation of the radiation being measured or other effects causing erroneous measurements. In high energy applications such materials may be insignificant or even desired because of their ability to attenuate radiation. Other additivies or substrate types having similar properties may accordingly be avoided or desired.

A transparent substrate material such as glass allows the level of thermoluminescent emissions to be read either from the phosphor side 21a of substrate 21 or from the back side 21b. Substrate 21 can be provided with an optional luminescent emission reflective coating 27 (shown in phantom on back side 21b) to reflect thermoluminescent emission out through phosphor side 21a for more complete detection of the level of thermoluminescent energy released. A similar metallic or other reflective coating 27a can also be used between phosphor-matrix layer 22 and substrate 21.

Other suitable substrate materials include beryllium oxide (BeO), other tissue-equivalent ceramics, aluminum oxide ceramic, hot-pressed lithium fluoride ceramic, boron nitride, carbon, and aluminum. Aluminum compositions are not the most preferred substrate materials because of relatively high thermal conductivity and relatively high coefficients of thermal expansion and some deviation from strict tissue equivalency. In general when using inflexible binder materials, the selected substrate material should be chosen to have a coefficient of thermal expansion which lies within approximately one order of magnitude when compared to the coefficient of thermal expansion of matrix 25 or the composite phosphor-matrix layer 22. Thermal expansion rates for the substrate and phosphor matrix layer within such a range will in most combinations prevent thermal cracking and disintegration, although specific combinations of particular substrates and phosphor-matrix materials may experience relatively greater or less susceptibility to thermal expansion rate failures. In most applications a factor of two is most preferred as indicating the amount of thermal mismatch which is typically acceptable to prevent thermal cracking and disintegration.

Substrate 21 is preferably made relatively thin. In the case of Type 0211 glass, thicknesses lying in the range of 0.002–0.040 inch (50–1000 micrometers) are preferred. Substrate 21 is preferably made thin to minimize the amount of material adjacent phosphor-matrix layer 22 which must be heated as a necessary concomitant to heating of phosphor particles 24. Glasses are advantageous in this regard because of their relatively low thermal conductivities which reduce the amount of laser energy which must be used. At least some polymer substrates as described below are even lower in thermal conductivity thus reducing the heating power and/or time required.

The present invention also includes the discovery that a thin glass substrate can be used to achieve accurate and reliable dosimeter measurements even though glass is considered a non-tissue-equivalent materials. The suitability of properly selected glass substrates is further enhanced when a surrounding frame supporting dosimeter 20 is made from tissue-equivalent materials. The usefulness of glass is important since glass substrates are easily processed, inexpensive, and capable of withstanding the very high (up to approximately 4000° C./cm) thermal gradients occurring during laser heating. In dosimeters not requiring as high of laser heating the polymer substrates can provide substantial tissue-equivalency.

The binder or matrix material 25 is advantageously a heat fusible inorganic binder material capable of withstanding the high thermal gradients and approximately 400° C. or higher temperatures experienced during laser reading of dosimeters. Suitable binder materials are Display Sealing Glasses 7555 and 7556 manufactured by Corning Glass Works of Corning, N.Y. Sealing Glass 7555 is a vitreous sealing glass having a softening point of 415° C. and a sealing temperature of 450° C. The coefficient of thermal expansion is $90 \times 10^{-7}$ in./in./°C., for the range 25°-300° C. Type 7556 is a similar glass having a lower coefficient of thermal expansion and a lower softening point. Types 7555 and 7556 are not tissue-equivalent glasses but exhibit radiation attenuation properties which are not substantial enough to prevent acceptable results in most cases. In other embodiments as described below organic materials such as a polymer binder can alternatively be used.

Binder materials are most preferably chosen to be tissue-equivalent or nearly tissue equivalent unless attenuation of higher energy radiation exposure is desired. A suitable glass which is nearly tissue equivalent is currently designated as Corning Experimental Glass 869AVW. The composition of Type 896AVW is as follows: $SiO_2$—51%; $Al_2O_3$—12.5%; $B_2O_3$—24%; $Li_2O$—6%; $Na_2O$—5.5%. Type 869AVW exhibits a softening point of 602° C. and a coefficient of thermal expansion of $7.2 \times 10^{-6}$/°C.

Other inorganic binder materials exhibiting the ability to fuse and bond phosphor particles to a desired substrate are also within the scope of ths invention. The softening temperatures of the glass or other inorganic binder should be less than the softening temperature of the substrate. This assures that it is sufficiently low so that the heat-fusing processing temperature of the dosimeter does not exceed the temperature capability of the substrate and phosphor particles used.

The phosphor composition particles 24 can be made from a single type or mixtures of thermoluminescent phosphors well known in the art. Examples of acceptable phosphors include; lithium fluoride (LiF); lithium borate ($Li_2B_4O_7$); calcium sulfate ($CaSO_4$); calcium fluoride ($CaF_2$); magnesium borate ($MgB_4O_7$); beryllium oxide (BeO); and aluminum oxide ($Al_2O_3$). These or other phosphors are appropriately doped with dysprosium (Dy), thulium (Tm), manganese (Mn), samarium (Sm), copper (Cu), Silver (Ag), titanium (Ti), and magnesium (Mg) or other dopants in order to give the desired thermoluminescent properties, as is well known in the art. The specific application of the dosimeter will in many cases suggest preferred types of phosphors. The following Table 1 shows some known operable phosphors useful in this invention Many other will undoubtedly be useful.

TABLE I

| Phosphor | Dopant |
|---|---|
| Aluminum oxide | none - naturally thermoluminescent |
| Beryllium oxide | none - naturally thermoluminescent |
| Lithium fluoride | none - naturally thermoluminescent |
| Lithium fluoride | Ti, Mg |
| Lithium borate | Mn, Cu |
| Magnesium borate | Dy, Tm |
| Calcium sulfate | Mn, Dy, Tm, Sm |
| Calcium fluoride | Mn, Dy |

The phosphor composition particles 24 should be appropriately sized and configured to provide the effectiveness desired for thin layer dosimeters according to this invention. If the particle size is too small the thermoluminescent energy storage and emission capabilities of the phosphor are diminished. If the grain sizes are too large the layer is not sufficiently uniform and is difficult to bind to substrate 21 using binder matrix 25. Surface densities of 1-30 milligrams per square centimeter have been found preferable. Phosphor grain or particle sizes are advantageously less than 100 microns in size, more preferably in the range of 1-100 microns, even more preferably 10-60 microns.

Phosphor composition particles 24 can be made exclusively of thermoluminescent phosphor materials as taught above, or alternatively, such materials can be mixed or extended with other suitable material for purposes of bonding, processing or other desired property of properties sought in addition to the thermoluminescent effect. If dosimeters as desired using phosphors other than thermoluminescent phosphor similar approaches apply. One such additive is boron nitride which is tissue-equivalent and can be added to improve thermal conductivity. Various isotopes of lithium and boron are also potentially of value as additives or blends with phosphors.

One or more dosimeters 20 can advantageously be mounted in a supporting frame such as shown in FIGS. 3, 4, 5, and 6. FIGS. 3 and 4 show a frame 60 having a plurality of apertures 63 formed therethrough. Apertures have associated ledges 64 formed therein for receiving and supporting dosimeters such as dosimeter 20 therein. Dosimeters 20 can advantageously be mounted in frame 60 using a suitable adhesive.

Frame 60 can be constructed using a variety of materials. Radiation dosimetry has previously recognized the desirability of using dosimeters which have radiation absorption properties which are equivalent to the human skin or other organisms or objects for which radiation measurements are being measured. This is often terms "tissue equivalency" and it is often an important consideration in dosimeter systems. In most situations it is desirable to construct frame 60 and similar frames, badges and cases for the dosimeters of this invention from rear tissue-equivalent materials. There are a number of materials considered tissue equivalent which are useful for this purpose. A number of plastics such as polyethylene, ABS and PTFE are accepted as sufficiently tissue-equivalent and the frame 60 of FIG. 4 is shown constructed of such tissue-equivalent polymers. Alternative materials having sufficient tissue-equivalency for use as preferred frames include aluminum (Al) and beryllium oxide (BeO). Others will clearly be possible.

FIG. 5 shows an alternative frame 70. Frame 70 is made from aluminum or other suitable material having a substantial degree of tissue equivalency. Because of the thermal expansion experienced by substrate 21 of dosimeter 20 during laser heating it is preferable not to adhere or tightly bind the substrate to frame 70. Dosimeter insert 20 is secured to the aluminum by positioning within an aperture 73 having a ledge 74 similar to ledges 64. A high temperature plastic or elastomeric insert or ring 79 can be interposed between the dosimeter 20 and frame allow for easier mounting, thermal isolation, and to accommodate thermal expansion. Dosimeter insert 20 is positioned upon ledge 74 within insert 79 and further secured in place using a layer of high temperature plastic 75. Plastic layer 75 can be KAPTON or TEFLON films available from DuPont. Film 75 is adhered to frame 70 using a silicone or other adhesives well known in the art.

FIG. 6 shows a still further alternative substrate holder or mounting structure 80 similar to frames 60 and 70 described above. Frame 80 is distinctive in that dosimeter insert 20 is mounted within aperture 81 by thermally forming a retaining flange 82 upon the upper side of substrate 21 thereby capturing dosimeter insert 20 within frame 80.

Figure 14A:
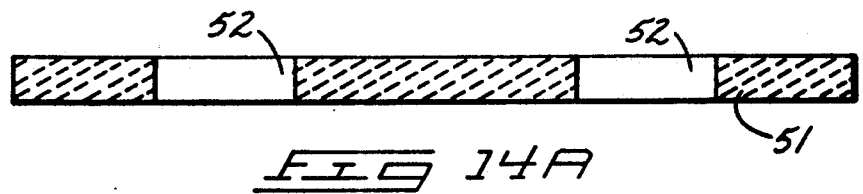
FIGS. 14A-14D illustrate a method for mounting dosimeter inserts to frames according to this invention.
Figure 14B:
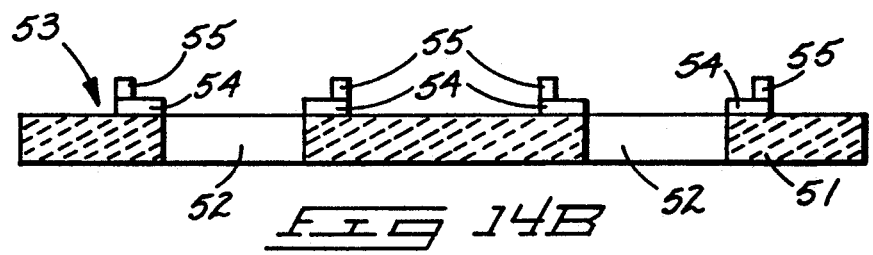
Figure 14C:
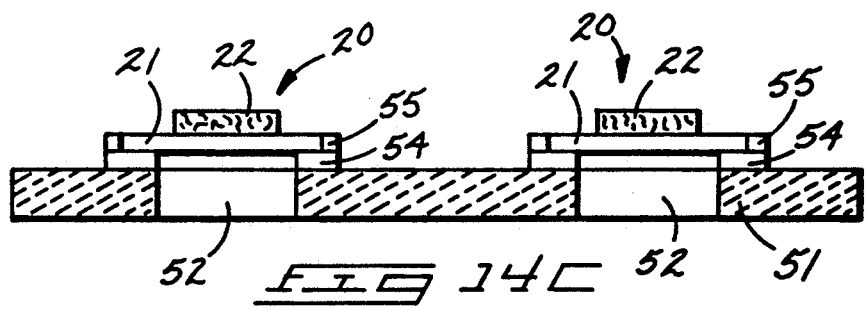
Figure 14D:
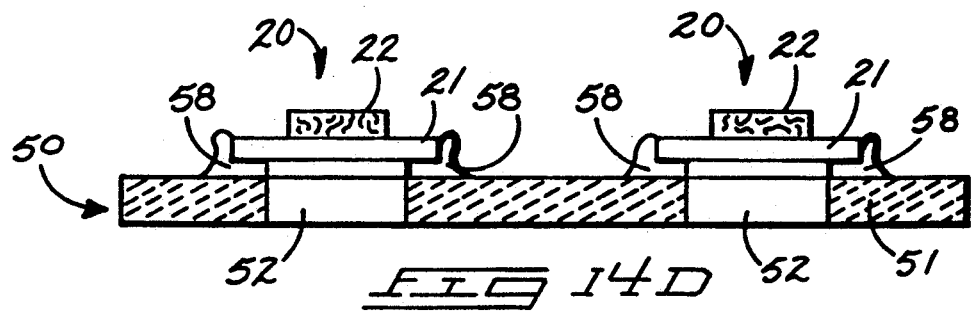

FIG. 14D shows a further alternative construction for mounting dosimeter inserts 20 onto a frame 51. Frame 51 is constructed of BeO and is provided with two apertures 52 extending therethrough. A weld of sealing glass 58 is formed around at least portions of substrate 21 to bond the substrate in place adjacent to aperture 52. Further explanation of the method used to join substrate 21 and frame 51 will be given below.

Other alternative means for mounting dosimeters to suitable frames are given hereinafter.

FIG. 7 shows a further dosimeter 84 according to this invention. Dosimeter 84 includes a frame 85 and a plurality of dosimeter inserts 20. Frame 85 includes an outer perimeter having approximately square side portions 86 and rounded corner portions 87. One corner of the perimeter is formed into an angled corner 87a which serves to positively identify the orientation of frame 85 when read in automated laser dosimeter reading machinery.

Frame 85 further is provided with a center pivot apertue 88 about which frame 85 can be pivoted. Frame 85 can be pivoted to position individual dosimeters 20 which are appropriately mounted within apertures 90. Apertures 90 are arranged about pivot aperture 88 at approximately equal angular posiitons and at approximately equal radii from the pivotal axis defined by circular pivot aperture 88.

FIG. 8 shows an alternative dosimeter structure 92 conceptually similar to that shown in FIG. 7. Dosimeter 92 includes a frame 93 having a central pivot aperture 94 and a plurality of dosimeter apertures 95. Dosimeter inserts 20 or their equivalent are mounted within apertures 95. Apertures 94 and 95 are arranged similar to apertures 88 and 90 described above.

The outer perimeter of frame 93 includes a large circular portion 96 and a small circular portion 97. A small flat 98 and a large flat 99 are formed along the outer perimeter of frame 93. Flats 98 and 99 serve to identify the angular portions of the dosimeter in automated reading equipment (not shown). The use of differently sized flats 98 and 99 prevents inadvertent upside down placement of dosimeter 92 within such reading equipment (not shown).

Figure 10:
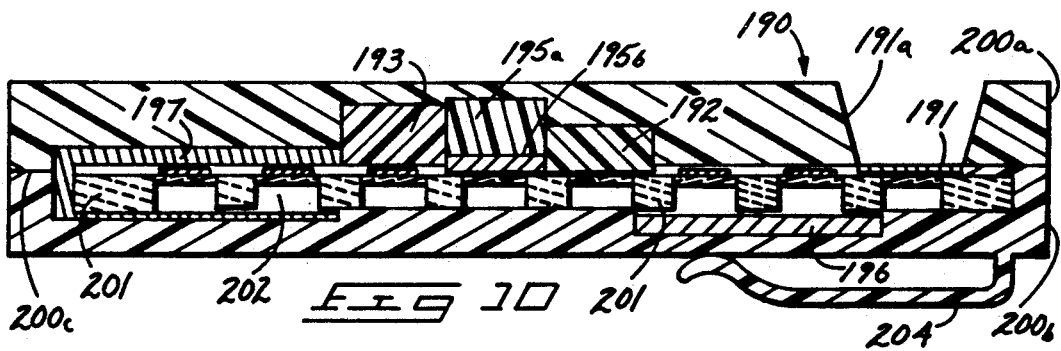
FIG. 10 is a sectional view of the dosimeter of FIG. 9 taken along line 10—10.

FIGS. 9 and 10 show a dosimeter 190 having a case 200 and a dosimeter frame 201. Dosimeter frame 201 has a plurality of dosimeter elements 211–218 arranged in two parallel rows of eight inserts. Other arrangements are clearly possible such as explained herein. The dosimeter elements are individually numbered 211–218 to designate the type of phosphor insert used. Two rows are provided so that there are pairs of dosimeter elements for redundant measurements or for statistical accuracy when relatively long storage times are experienced. The dosimeter frame 201 is provided with apertures 202 which are used to mount inserts 211–218 in a suitable manner as described elsewhere in this specification.

Case 200 is advantageously made in two parts 200a and 200b which are divided along a lateral part line 200c. Case parts 200a and 200b can be held together with fasteners (not shown), engaging parts (not shown), adhesives or otherwise as is well-known in the art. Case 200 is further provided with a clip 204 which can be used to hold the dosimeter on a shirt or suit pocket. Other means for attaching the case to people, clothing or other objects are clearly possible.

Case 200 is advantageously adapted to carry a plurality of radiation filters or reflectors for selectively passing, filtering and/or reflecting particular radiation types or to attenuate radiation generally. FIGS. 9 and 10 show relatively thin filters 191 mounted on the front side of dosimeter inserts 211 within recesses 191a. Recesses 191a reduce the radiation attenuation effect caused by the case material itself. Such recesses or apertures can be used in other applications to accurately adjust the filtering used with particular dosimeter inserts. Filters 191 can advantageously be made from a material exhibiting radiation affecting properties which are tissue-equivalent. Filters 191 can be appropriately provided with a surface density of approximately 7 mg/cm$^2$ of such material to simulate the radiation dose receiveed by the skin, particularly with regard to beta and gamma radiation. Case 200 also advantageously mounts a filter 192 over inserts 214. Filter 192 can be made with a surface density of 300 mg/cm$^2$ of tissue-equivalent material to simulate the does received by the human eye.

A deep dose filter 193 can further be mounted in case 200. Filter 193 is advantageously made with a surface density of 1000 gm/cm$^2$ from a tissue-equivalent material. Filter 193 will effectively limit exposure of phosphor layers 216 to low energy radiation.

A further filter 195 is used to discriminate fast neutron dose. Filter 195 includes a first part 195a which is the same as filter 193. A second part 195b is a proton radiator which generates protons from collisions with fast neutrons. The protons produce measurable thermoluminescent energy storage which indicates fast neutron dose. The gamma radiation background level from phosphor inserts 216 is subtracted from the measured amounts of inserts 215 to selectively measure fast neutrons.

A still further filter 197 is used to cover inserts 217 and 218. Filter 197 covers both sides of such inserts. The front side advantageously uses a 50 mil (1.3 mm) thick cadmium or boron filter whereas the back side can use a 15 mil (0.4 mm) thick layer of the same or similar material. The phosphor layers 217 and 218 are advantageously TLD-600 and TLD-700, respectively. TLD-600 and TLD-700 are lithium fluoride made with different isotopes of lithium. Lithium-6 is thermal neutron sensitive whereas Lithium-7 is not. The difference in sensitivity allows assessment of the thermal neutron exposure. Other phosphors such as lithium borate made using the same distinctive isotopes of lithium produce a similar configuration. It is also possible to add different isotopes of lithium or boron (boron-10 and boron-11) as an admixture to other phosphors, such as calcium sulfate to produce two dosimeter elements having different sensitivity to thermal neutrons or other radiation forms. This configuration produces an albedo effect with the front filter shielding against incident thermal neutrons.

Incident thermal neutrons are identified using TLD-600 and TLD-700 phosphors for spots 212 and 213. A 50 mil (1.3 mm) or thicker cadmium or boron filter 196 behind these spots shields against albedo (backscattered) neutrons.

Filters 191–193, and 195–197 are advantageously mounted to case parts 200a and 200b using adhesives or other suitable means. A variety of additional filter types can alternatively or additionally be used as required by the specific application to which a dosimeter is being put.

Figure 27:
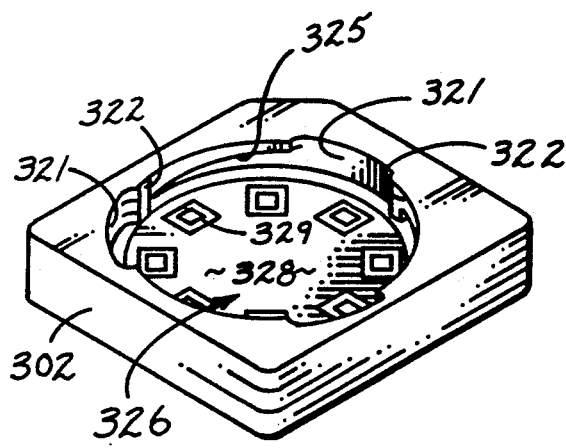
FIG. 27 is a perspective view of a casing adapted to receive the dosimeter of FIG. 26. Note that the dosimeter of FIG. 26 is flipped over prior to installation into the casing of FIG. 27.
Figure 28:
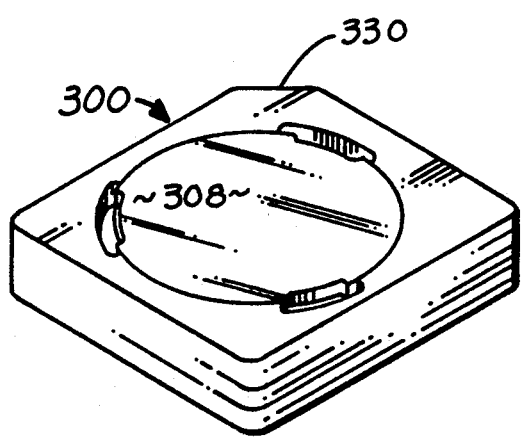
FIG. 28 is a perspective view similar to FIG. 27 with the dosimeter of FIG. 26 installed therein.
Figure 29:
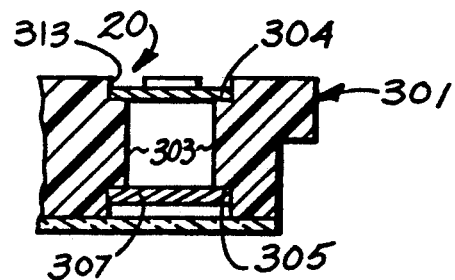
FIG. 29 is a partial sectional view taken at line 29—29 of FIG. 26.

FIGS. 26–29 show an alternative case configuration useful in dosimeters according to this invention. Case 300 includes a disk 301 and a mounting casing 302. Disk 301 is provided with a plurality of apertures 303 which extend through disk 301 and are provided with top and bottom ledges 304 and 305, respectively. Note that FIGS. 27 and 28 are upside down with respect to FIGS. 26 and 29. Top ledges 304 are used to adhesively mount dosimeter inserts 20. Bottom ledges 305 are used to adhesively mount back filters 307, if desired. Disk apertures 303 are preferably provided with projections 313 spaced from ledges 304 and 305 so that the inserts or filters can be snapped into place in a mechanical engagement with the dosimeter frame. The entire back of disk 301 can be covered with a transparent or opaque face 308 made from plastic or glass. Alternatively, the back can be left uncovered.

Disk 301 is provided with a series of bayonet mounting projections 310 spaced angularly about the disk, for being received in mating reception channels 321 formed in casing 302. Stops 322 are provided in casing 302 to limit angular travel of disk 301 in channels 321. Channels 321 have sloping surfaces 325 which draw the disk into receptacle 326. Casing 302 is advantageously provided with a front wall 328 which is used to mount individual front filter 329. Casing 302 is also advantageously provided with one clipped or identifiable corner 330 to simplify mounting and/or automated handling.

Preferred methods for producing the thin layer laser readable dosimeters according to this invention will now be further described. The methods involve selecting at least one suitable phosphor, such as a thermoluminescent phosphor. A variety of luminescent or thermoluminescent phosphors can be used as indicated above. The phosphors must be purchased or made into granules or particles having a particle size approximately equal to or less than the desired thickness of the phosphor matrix layer which is to be produced. Particle sizes in the ranges indicated hereinabove are preferred.

It may be desirable in certain instances to combine the luminescent phosphor powder with additives or relatively inert materials for purposes of manufacture or otherwise. Inclusion of such additives or extenders in a luminescent phosphor composition is clearly within the scope of this invention.

The thermoluminescent phosphor compositions are advantageously intermixed with at least one type of granular or powdered inorganic binder material. Preferred types of binder materials are the sealing glass binder and other equivalent materials taught or described herein. The binder materials are ground or otherwise provided in or prepared to grain sizes which are preferably smaller than the general or average grain sizes of thermoluminescent phosphors being intermixed therewith. The softening temperature of the inorganic or glass binder materials must be less than the melting or decomposition temperature of the substrate with which the binder materials will be used.

The phosphor composition and inorganic binder materials can be mixed in a variety of proportions. A weight ratio of 4:1 thermoluminescent phosphor to binder, such as sealing glass binder, has been found preferable. Ratios varying from 10:1 to 1:2 are believed useful depending upon the type of materials used, the grain sizes and the type of substrate onto which the materials will be applied.

The selected phosphor composition and binder material are advantageously intermixed to produce a substantially homogenous phosphor-binder mixture. Initial mixing of powdered ingredients is preferably done in a dry state. The ingredients can also be initially mixed or additionally mixed in the presence of some further agent, such as a printing vehicle as explained more fully hereinafter. Fluid binders are also possible as explained hereinafter.

The method further involves selecting an appropriate substrate. Suitable substrate materials and thicknesses are described hereinabove. The surface of the substrate receiving the phosphor-matrix layer should be suitably cleaned. Depending on the type of binder and substrate materials chosen it may be desirable to select a particular range of surface textures for improved bonding. The substrate can also be coated with any suitable coating for either bonding or radiation affecting purposes.

The method further involves depositing the phosphor-binder mixture onto the selected substrate. Deposition of the mixture onto the substrate is preferably done using the following procedure.

The phosphor-binder mixture is advantageously mixed with a suitable printing vehicle or other liquid substance serving an equivalent function. The vehicle used must leave only a very small amount of residue when dry or further processed, preferably less than 1% of the vehicle. The vehicle must also be capable of forming a mixture ranging in consistency from a plastically deformable paste to a fluid liquid mixture. The mixture further should have a viscosity which allows the phosphor-binder-vehicle to be applied to the substrate in a layer having approximately uniform thickness. One class of vehicles found acceptable for use in this invention are made from ethylcellulose dissolved in a high temperature solvent. One suitable solvent for such vehicles is pine oil. Other solvents and/or solvent and polymer combinations may be also acceptable as vehicles. Vehicles typically have additives which help to control properties such as viscosity, homogeneity, thixotropy and drying characteristics. The specific solvent used also will necessarily affect such properties of the vehicle. The current invention requires a vehicle which can be mixed with glass frit or other binder composition and also be acceptable for use with the particular phosphor composition being used. A preferred vehicle is type 400 available from Electro-Science Laboratories of King of Prussia, PA. Other useful vehicles include types 403, 406, 414, 416, 417 and 424, also from Electro-Science Laboratories. Those skilled in the art will recognize a variety of suitable printing vehicles or similar functioning compounds for mixture with the phosphor and binder compositions.

Figure 11A:
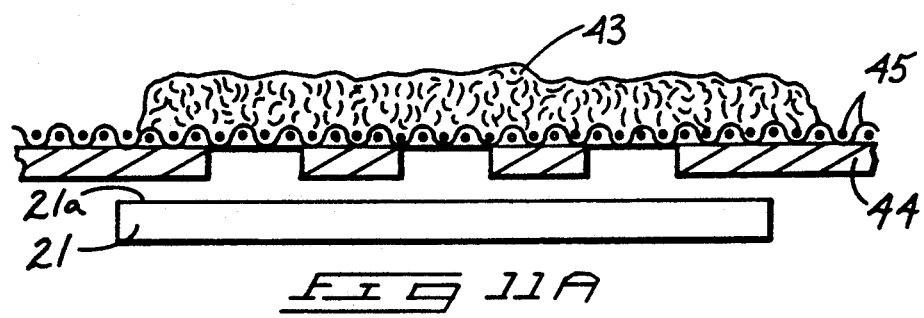
FIGS. 11A-11C are sectional views illustrating a method for producing dosimeters according to this invention.
Figure 11B:
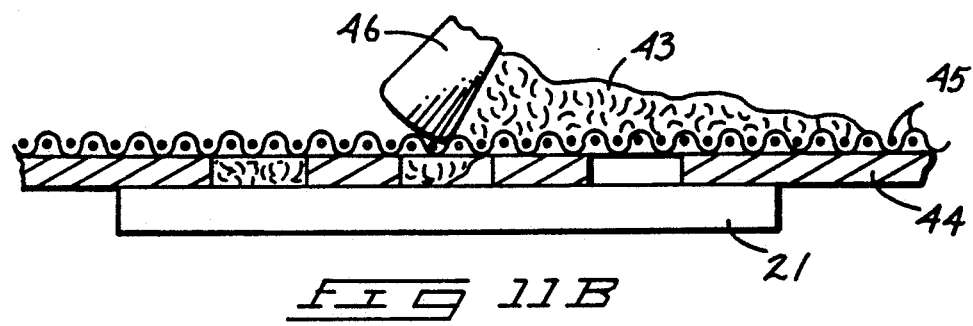
Figure 11C:
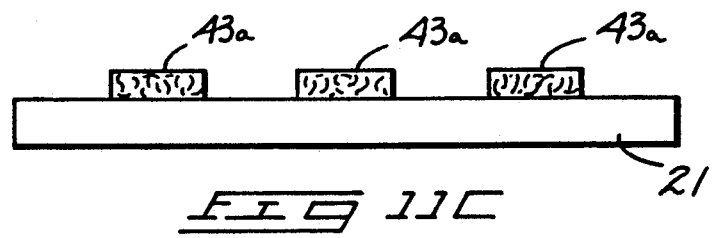

A resulting phosphor-binder-vehicle mixture is preferably applied to the substrate using a printing process such as illustrated in FIGS. 11A-11C. The phosphor-binder-vehicle paste 43 is advantageously placed upon a screen 45. A mask 44 is positioned between screen 45 and the substrate phosphor surface 21a. A brush 46 or other utensil is used to force the viscous paste through screen 45, particularly where mask 44 has openings 44a formed therethrough as shown in FIG. 11B. The applied layers 43a shown in FIG. 11C adhere to the substrate surface due to the properties of the printing vehicle. The mask, screen and remaining paste are moved from the substrate leaving one or more relatively uniform layers 43a thereon. FIGS. 11A-13 show the layers with exaggerated vertical dimension.

The phosphor-binder-vehicle mixture can also be deposited by mechanically applying the mixture to desired locations on a substrate using an appropriately sized spreading tool. Unwanted deposits can be removed to form desired shapes and sized for the deposits of such mixture. Spray systems, mechanical extrusion equipment or other types of equipment may alternatively provide means for integrated or discrete deposition of the constituents or combined phosphor-binder-vehicle mixture.

The applied phosphor-binder-vehicle layers 43a are preferably left to dry at approximately 100° C. for a suitable period of time, such as 1-3 hours, to allow the solvent contained in the vehicle to volatilize. The substrate and applied phosphor-binder-vehicle layers 43a are then heated to a sufficient temperature to volatilize and pyrolyze the remaining vehicle and reduce the vehicle residue to an acceptably low level. The temperature used to remove the vehicle is herein termed the burnoff temperature and is advantageously about 400° C. when the type 400 printing vehicle and type 7555 sealing glass binder is used. The burnoff temperature should be less than the softening temperature of the binder material to assure that the vehicle is fully removed before the binder is fused.

After the vehicle has been adequately burned off, the substrate and remaining phosphor-binder spots 43b (FIG. 12) are raised to a temperature at or above the softening temperature of the binder. This heating step above the softening temperature causes the inorganic binder particles to soften, fuse and bond to the substrate. The softened binder also tends to bond to the particles of phosphor 24 thus achieving a phosphor-binder matrix which is bonded to the substrate. The dosimeters being made should be held at a temperature somewhat above the softening temperature for a sufficient period of time to allow the fusing and bonding to occur. The heating and cooling of substrate 21 and applied phosphor-binder layers 43 should be done at rates which do not cause thermal shock to occur.

It is alternatively possible to deposit the phosphor and binder in two or more separate and distinct deposition steps. One advantageous method involves mixing the binder with a suitable vehicle and depositing the resulting binder-vehicle mixture onto the substrate. Deposition can occur using the printing technique described above or using other suitable techniques. After the binder-vehicle mixture has been deposited, a suitable thermoluminescent phosphor composition is applied to the undried binder-vehicle mixture. Excess phosphor composition which does not adhere to the binder-vehicle mixture is then advantageously removed, such as by shaking, vacuum or other removal process.

Figure 22:
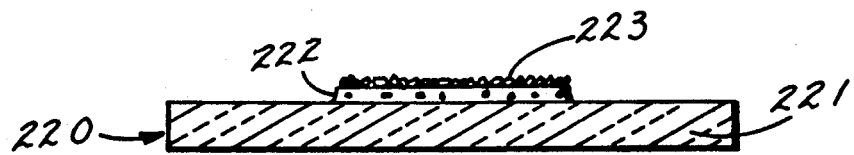
FIGS. 22 and 23 are side sectional views of an alternative dosimeter produced using an alternative method of this invention.

FIG. 22 shows a dosimeter 220 having a substrate 221 upon which has been applied a layer of binder-vehicle mixture 222. Phosphor composition particles 223 have been deposited upon the binder-vehicle mixture layer 222 and adhered thereto. Excess unadhered particles have been removed. After these procedures the resulting binder-vehicle phosphor are allowed to dry to remove remaining solvent from the vehicle.

Figure 23:
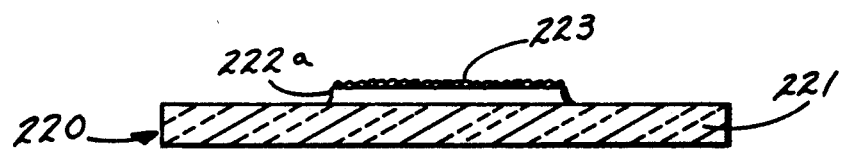

FIG. 23 shows dosimeter 220 after the binder-vehicle mixture has dried and the dosimeter has been heated to or above the softening temperature of the binder composition. The binder layer 222a has fused and bonded to both the substrate 221 and the phosphor composition particles 223 using a procedure substantially similar to that described elsewhere herein. The dosimeter construction just explained has been found very tolerant of thermal mismatch between the substrate and phosphor material. Lithium floride has been found particularly well handled using such novel methods and structures according to this invention.

Figure 24:
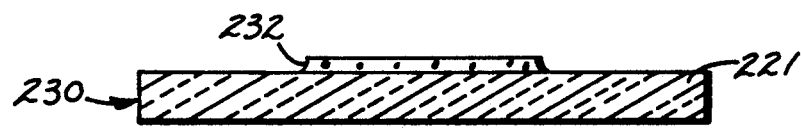
FIGS. 24 and 25 are side sectional views of a still further alternative dosimeter produced using a still further alternative method of the invention.
Figure 25:
Figure 26:
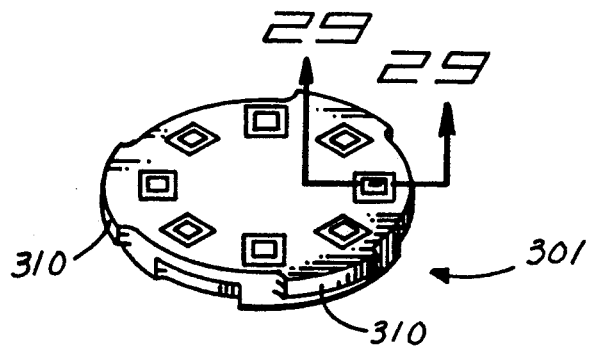
FIG. 26 is a perspective view of an alternative dosimeter of this invention.

Another method and dosimeter construction of this invention is illustrated by FIGS. 24 and 25. FIGS. 24 shows a substrate 230 with an applied layer of binder-vehicle mixture 232 applied thereto. The substrate and vehicle binder mixture are then dried and heated to fuse and bond the binder to the substrate. FIG. 25 shows an additional vehicle-phosphor layer 234 deposited upon the fused and bonded layer 232 of binder. Layer 234 is then dried and heated to above the softening temperature of the binder to bond the phosphor particles of layer 234 to binder layer 232a. Addition layers can be overprinted using a protective material, such as the binder glass, as will be explained more fully below.

Figure 12:
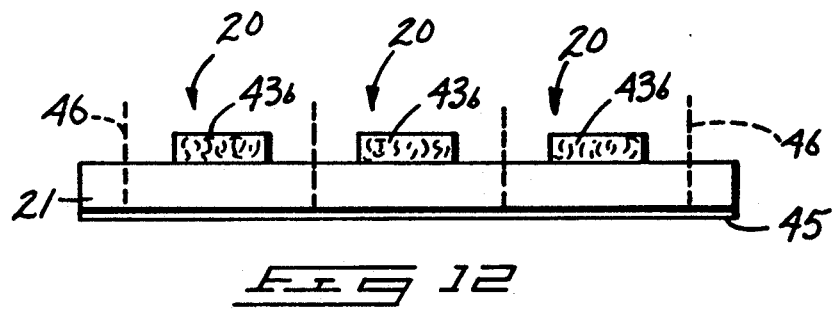
FIGS. 12 and 13 show further processing of the dosimeters made in FIGS. 11A-11C.
Figure 13:
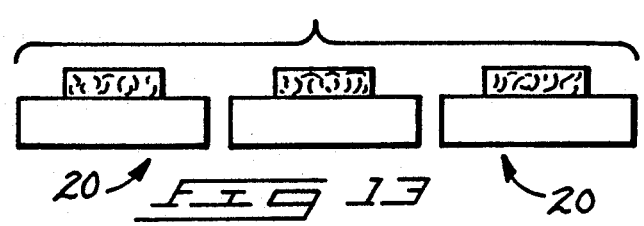

After the binder has softened, fused, bonded and cooled it is possible to divide the substrate into individual dosimeters or dosimeter inserts. FIGS. 12 and 13 illustrate that the substrate 21 can be divided at appropriate locations to produce the individual dosimeters 20. Division of dosimeters 20 is advantageously accomplished using a plastic layer or film 45 which is adhesively applied to the back surface of the substrate. A diamond blade saw or other means can then be used to saw or otherwise divide as indicated by lines 46. The individual dosimeter units or elements 20 are shown in FIGS. 13. The units can be retained upon the plastic backing for ease or convenience in handling since the diamond saw can be set to cut only the substrate and not plastic layer 45. Alternatively, the plastic backing and substrate can be cut prior to formation and processing of the phosphor-binder layers.

The individual dosimeters are then either used directly or mounted in suitable frames, cases or badges as described above. Alternative structures and methods for mounting the novel dosimeters of this invention are described herein.

FIGS. 14A-14D illustrate a further preferred method for attaching thin layer dosimeter inserts 20 to a structural frame or framework 51. Framework 51 is advantageously provided with two or more apertures 52 which extend therethrough, but could alternatively extend partially through frame 51. A first layer 54 of sealing glass or other inorganic bonding agent is deposited upon the surface of substrate 51 in a shape and size designed to receive and support substrate 21. A second layer 55 of sealing glass or other inorganic bonding agent can be deposited upon the first layer 54. Both layers are advantageously deposited in a manner similar to the preferred method for depositing phosphor-binder onto the substrate 21 as described above with respect to FIGS. 11A-13. A single layer of bonding agent can alternatively be used.

Substrate 21 with phosphor-binder layer 22 is then positioned upon layers 54 and within layer 55. The framework 51, substrate 21, phosphor binder layer 22 and the layers 54 and 55 of inorganic bonding agents 54 and 55 are then exposed to elevated temperatures at or above the sealing or bonding temperatures of layers 54 and 55. Layers 54 and 55 fuse and bond substrate 21 to framework 51 to form an integrated dosimeter as shown in FIG. 14D. Phosphor-binder layer 22 can be either fused or unfused prior to bonding of layers 54 and 55.

Frame is preferably made from beryllium oxide, aluminum oxide or other nearly tissue equivalent ceramic materials having a coefficient of thermal expansion not greatly different from the glass or other material of substrate 56 and the sealing glass or other bonding agent used for layers 54 and 55. A variety of alternative materials may be possible consistent with the requirements of such a dosimeter.

Alternative methods for mounting dosimeter inserts such as 20 are also clearly possible. The frame of FIG. 5 is provided with a dosimeter insert which is mounted with a high temperature plastic film. Such a mounting structure may be used with frames which have a substantially different coefficient of thermal expansion than the substrate. However, such organic elements of dosimeters 76 typically cannot withstand high temperature annealing in an oven where the frame and substrate are heated to temperatures of 300°-400° C. At such temperatures plastic and other organic material typically degrade. According to laser annealing processes newly developed by the inventors hereof, it is no longer necessary to oven anneal but instead localized annealing of the phosphor can be accomplished using a laser beam. Dosimeters and methods according to this invention are useful for making oven annealable dosimeters such as illustrated and explained with respect to FIGS. 14A-14D, and are also useful for making laser annealable dosimeters such as shown in FIGS. 4-6 and elsewhere herein.

The dosimeter of FIGS. 3 and 4 is advantageously made by preparing dosimeter inserts 20 and frame 60. Frame 60 can advantageously be an injection molded plastic member. Inserts 20 are positioned within apertures 63 on the ledges 64 and secured thereon using a suitable adhesive.

The frame of FIG. 5 is constructed by first preparing a dosimeter 20. An insert ring 79 is also made according to well known plastic molding or forming techniques. The insert is positioned within a ledged receiving aperture 73 formed in frame 75. The dosimeter is then positioned within the ring insert 79. A high temperature plastic film or molded piece 75 is adhesively applied to frame 70 and the outer edges of dosimeter 20 holding the dosimeter in location.

The dosimeter of FIG. 6 is constructed by positioning a dosimeter 20 within an aperture 81 formed in frame 80. The portions of frame 80 adjacent to aperture 81 are then thermally formed so that the dosimeter insert 20 is held securely in position.

The invention further includes water and moisture resistant laser readable dosimeters and methods for constructing such dosimeters. Thermoluminescent phosphors are often susceptible to degradation from moisture and other chemicals. The below-described embodiments effectively encapsulate the phosphor to protect from such degradation.

A preferred embodiment of moisture resistant dosimeter is illustrated in FIG. 15. Dosimeter 120 includes a substrate 121 which can advantageously be a thin square of glass having a thickness in the range indicated hereinabove. Substrate 121 has a phosphor-matrix layer 122 formed thereon which has been exaggerated for presentation in FIG. 15. The phosphor matrix layer 122 includes a plurality of phosphor particles 123 and an interposed bonding matrix 124 which is bonded to particles 123 and substrate 121.

The moisture resistive properties of dosimeter 120 are achieved by having a relatively high ratio of inorganic binder to phosphor particles. Ratios of 10:1 to 1:2 were hereinabove indicated as useful. Mixtures of phosphors to binder of 1:1 or 1:2 are preferred to preparing dosimeter 121 and similar dosimeters in accordance with this invention. the inorganic binder should preferably be ground substantially smaller than the phosphor particles 122, such as by using a 10 micron grain size binder material with a 50 micron grain size phosphor.

Dosimeter 120 is made according to the method of manufacture discussed above with regard to the embodiment of FIGS. 1 and 2. The high temperature fusing and bonding causes the relatively numerous binder particles to soften and flow around and over the phosphor particles 123 thereby effectively coating and bonding the phosphor particles to each other and substrate 121. The glass or other inorganic coating formed by matrix 124 protects the phosphor particles from degradation and deactivation due to exposure to water, airborne moisture, or other degrading substances. Dosimeter 120 can be mounted in suitable frames, cases and in badges as described or taught herein.

Another embodiment moisture resistant dosimeter 130 is shown in FIG. 16. Dosimeter 130 includes a substrate 131 and a bonded phosphor-matrix layer 132 which is bonded to substrate 131 according to the methods described above with respect to FIGS. 1 and 2. The fused phosphor-matrix layer 132 is then overprinted or otherwise coated with a secondary protective layer 133 which is advantageously made from a binder material and a suitable vehicle. Other inorganic overlay materials are also possible for use in forming protective layer 133.

The secondary layer 133 is then heated to the requisite softening temperature or higher thus causing the overprinted binder particles or other overlay material to soften, flow over, fuse and bond to phosphor matrix layer 132 and substrate 131. An encapsulating layer or envelope is formed by the resulting fused and bonded secondary layer 133, thereby protecting the enclosed phosphor particles 134. Dosimeter 130 can be used as indicated above, such as in the form of an insert mounted in a larger frame or case. It can also be used in specialized applications by direct mounting or otherwise as the circumstances dictate.

A further moisture resistant dosimeter 150 is illustrated in FIG. 17. Dosimeter 150 includes suitable substrate 151 which is advantageously a small thin pane of glass. A phosphor-matrix layer 152 having phosphor particles 153 and a matrix of fused binding material 154 is bonded to substrate 151 and phosphor particles 153.

Dosimeter 150 also includes a glass or other transparent covering piece 155. Covering piece 155 is mounted to substrate 151 using a connecting seal 156 of sealing glass or other inorganic bonding and sealing material. Seal 156 is bonded to cover piece 155 and substrate 151 about the perimeter of cover piece 155 thus forming a sealed inorganic envelope which encapsulates the phosphor-matrix layer 152 protecting it from moisture and physical deterioration.

Dosimeter 150 can be produced by combining selected phosphor particles 153 with inorganic binding material particles and a suitable vehicle. The phosphor-binder-vehicle mixture is then deposited upon the surface of substrate 151, such as using the methods discussed above. A sealing layer can be similarly prepared using a sealing glass and vehicle mixture which is printed or otherwise deposited about the phosphor-matrix layer 152. The protective pane 155 is positioned on the dosimeter over sealing layer 156. The dosimeter 150 is then heated to the sealing temperature of the inorganic sealing glass or other sealing material used to produce seal 156. The seal softens, flows, fuses and bonds to substrate 151 and the covering piece 155. Phosphor-matrix layer 152 can be fused either at the same time as seal 156 or prior thereto.

It is noteworthy that in reading dosimeter 150 it may be preferred to heat the phosphor particles by impinging a laser beam such as from a $CO_2$ laser onto the back surface 151b of substrate 151. In general the glass or other cover piece 155 may not be transparent to the infrared laser beam or may be only partially transparent. In such case heating of the phosphor particles may be superior when the substrate is heated and heat flows by conduction through substrate 151 and matrix 154 to particles 153. Cover piece 155 may alternatively be constructed of an infrared transmissive material in which case heating can be direct radiation onto the phosphor particles with only limited radiation losses.

A still further alternative embodiment dosimeter according to the invention is illustrated in FIGS. 18 and 19. Dosimeter 160 includes a very thin central substrate 161 which is thermally insulated from an outer substrate 162 using a thermal barrier ring 163. Ring 163 is made of material having a relatively low thermal conductivity. Glass is advantageously used for thermal barrier 163. A suitable material for central and outer substrates 161 and 162 is beryllium oxide. Dosimeter 160 is preferably constructed by forming beryllium oxide or other suitable material into a blank 170 shown in FIGS. 20 and 21. Blank 170 includes a central substrate portion 171 having a recessed groove 173 formed around the perimeter adjacent to the connection with the outer substrate portion 172. Groove 173 is filled with molten or dry glass in order to form ring 163. When dry glass particles are used the blank and applied glass are heated so that the glass flows, fuses and bonds to blank 170.

The upper surface 175 of blank 170 is then lapped or otherwise removed until ring 163 is the only connecting element between the central and outer substrate portions. Alternative methods of making dosimeter 160 are also possible.

Dosimeter 160 allows heat to flow across the central substrate 161 because of the relatively good thermal conductivity of BeO. Flow of heat is impeded at the insulating ring 163 thus limiting the laser energy required. The relatively small amount of glass and predominant use of beryllium oxide makes dosimeter 160 nearly tissue equivalent. Dosimeter 160 can be mounted in a variety of frames or cases such as indicated hereinabove or may be used separately.

EXAMPLE 1

Glass substrate squares made of Corning Type 0211 glass were formed with sides 25 mm long, using standard glass cutting techniques. The square panes had a thickness of 0.1–0.2 mm. The cut substrate squares were prepared by washing in water and drying using a lint-free cloth. Calcium sulfate doped with dysprosium ($CaSO_4$:Dy), grain size 25–150 microns was selected as the phosphor material. Corning Type 7555 glass frit having a grain size of 10–20 microns was selected as the inorganic binder. 1.2 grams of the glass frit was mixed with 1.3 grams of $CaSO_4$:Dy phosphor particles, and 0.6 grams of pine oil and ethylcellulose printing vehicle, to form a paste. The resulting phosphor-binder-vehicle was spread onto the glass substrate squares using a tool having a slot with a slot height of 200 microns. The deposited phosphor-binder-vehicle layer was allowed to dry at 100° C. and then portions of the layer were removed to define individual dosimeter spots. Thereafter the substrate and applied layer was heated to 400° C. for one hour to volatilize the vehicle polymers and drive off any residual vehicle solvent. Thereafter the substrate and applied layer were heated to 425° C. for 15 minutes to begin softening the glass frit binder, and 500° C. for an additional 15 minutes to provide wetting, fusion, and subsequent bonding of the glass frit binder to the substrate and phosphor particles upon cooling.

EXAMPLE 2

Glass substrate squares were prepared as in Example 1. A phosphor binder-vehicle mixture was formed of the same constituents as in Example 1 in the follwing amounts: 2.3 grams $CaSO_4$:Dy; 1.15 grams glass frit; and 1.35 grams vehicle. The constituents were shaken for 15 minutes using a vibratory mixer. The resulting mixture was spread on the substrate squares using a grooved tool to produce layer thicknesses of approximately 100 and 200 microns. The substrates and deposited layers of phosphor-binder-vehicle mixture were dried at 100° C. for approximately 1 hour. The substrates with applied layers were then heated to 380° C. to complete volatilization of most of the vehicle. Thereafter complete burnout of the vehicle was accomplished at a heat of 425° C. for 15 additional minutes. The 425° C. temperature also softened the inorganic binder. The temperature was then raised to 500° C. to completely soften the binder and provide good interstitial wetting with the phosphor particles and substrate. The substrate was then cooled to bond the phosphor particles into a phosphor-binder matrix bonded to the substrate.

EXAMPLE 3

The same procedure of Example 2 was followed using lithium fluoride phosphor (LiF) in lieu of $CaSO_4$:Dy.

EXAMPLE 4

The same procedure of Example 2 was followed using lithium borate ($Li_2B_4O_7$) in lieu of $CaSO_4$:Dy.

EXAMPLE 5

The procedure of Example 2 was followed using CaSO$_4$:Dy phosphor having a particle size of less than 40 microns. Phosphor in the amount of 0.8 gram was mixed with 0.4 gram of the same glass frit and 0.45 gram of the same vehicle. The phosphor-binder-vehicle mixture was spread approximately 100 microns thick which resulted in a bonded dosimeter layer having 9–10 milligrams/cm$^2$.

EXAMPLE 6

The procedure of Example 2 was followed using lithium fluoride with grain size of 20–30 microns. Structural integrity and bonding of the resulting phosphor-binder matrix layer was found superior to similar dosimeters prepared in Example 4 using the 25–150 micron LiF phosphor grains.

EXAMPLE 7

A phosphor-binder-vehicle mixture was prepared using 15 grams CaSO$_4$:Dy (grain size 40–60 microns); 7.5 grams Type 7555 glass frit (grain size 10–20 microns); and 6 grams ethylcellulose and pine oil vehicle. The mixture was printed through a stainless steel screen having cutout portions onto 25 mm square glass substrates similar to those described in Example 1, having thicknesses of 0.12 and 0.3 mm. The screen formed deposited layers which were dried at 90° C. for approximately one hour and then placed in a belt furnace having four temperature zones set to 400° C., 475° C., and 400° C., for a total high temperature heating time of approximately one hour.

EXAMPLE 8

The procedure of Example 7 was followed using 25 grams CaSO$_4$:Dy (grain size less than 30 micron); 12.5 grams 7555 glass frit; and 8 grams of same vehicle.

EXAMPLE 9

The procedure of Example 7 was followed using 2 grams calcium fluoride phosphor doped with manganese (CaF$_2$:Mn) (particle size 20–30 microns); 1 grams 7555 glass frit (10–20 microns); and 1 gram Electro-Science Laboratories Type 414 vehicle.

EXAMPLE 10

The procedure of Example 7 was followed using LiF in lieu of CaSO$_4$:Dy. The firing temperatures were 400°–550°–550°–400° C. in lieu of those indicated in Example 7.

EXAMPLE 11

The procedure of Example 10 was followed using 18 grams CaSO$_4$:Dy (less than 40 microns); 9 grams glass frit (10–20 microns) and 10 grams type 414 vehicle. Different layer thicknesses were produced using different screen types. Layer thichknesses of 4, 6, 9, 12 and 15 milligram/cm$^2$ were obtained. The 25 mm square substrates were sawn into 6 mm squares each having a printed spot of phosphor-binder, using a diamond blade saw. The 6 mm square dosimeters were further processed by heating to 600° C. to anneal residual stresses from earlier processing. The individual dosimeters were then mounted on beryllium oxide and aluminum frames as described hereinabove and then tested.

EXAMPLE 12

The procedures of Example 7 were followed using a pane of BeO, approximately 0.12 mm thick, for the substrate. The BeO substrate was cooled and mounted to a BeO frame using the Type 7555 glass frit. The glass frit was mixed with a pine oil-ethylcellulose vehicle and then deposited onto the frame at appropriate locations to receive the extreme edges of the substrate. The substrate, frame and vehicle-binder mixture were then fired to bond the substrate and glass using temperatures similar to those indicated above.

EXAMPLE 13

Corning Experimental Glass type 869AVW was mixed with Type 400 ElectroScience Laboratories vehicle using approximately equal amounts of weight. The resulting mixture was deposited onto Corning Type 0211 glass panes having thickness of 5, 7 and 9 mils. Lithium fluoride phosphor particles (TLD 100) having grain sizes of approximately 30–60 microns, were then dusted onto the deposited vehicle-binder layers before the vehicle solvent had dried. Part of the phosphor particles adhered to the vehicle-binder layer and remained despite shaking of the substrate in an angled position. The vehicle solvent was then allowed to dry and the dosimeter was placed in the 4 zone belt furnace and fired to temperatures of 425°–550° C. to cause fusing and bonding of the glass binder to the substrate and applied phosphor particles. The resulting dosimeters exhibited superior resistance to thermal cracking and good sensitivity to radiation.

FIGS. 30–35 show the general arrangement of another preferred dosimeter badge 400 made in accordance with this invention. Dosimeter badge 400 includes a badge base or first part 401 and a second part or insert 402. Badge parts 401 and 402 are adapted for securement together into an assembly by a bayonet connection structure to enclose a sealed dosimeter mounting containment area. Badge 400 has a top or insert mounting face 404 and a bottom face 405. The planar shape of the dosimeter badge includes four side edges 411–414 which are rectilinearly related into a nearly square but slightly rectangular basic shape. The front or first side edge 411 is connected by a 45° diagonal corner 415 to the fourth or right side edge 414. This rectanular shape with a single diagonal corner gives the badge an asymmetrical outer configuration which can be uniquely identified by automated dosimeter reading equipment. The left or second side edge 412 is connected to the front side edge 411 at a rounded corner 416. Similar rounded corners 417 and 418 are between the second and third side edges 412 and 413, and third and fourth side edges 413 and 414, respectively. The outer periphery of the badge 400 has a groove 419 to aid in holding the badge within a badge holder (not shown) which has a ridge which engages the groove 419 as indicated below for another embodiment. The badge also advantageously include a difference in peripheral sizes along an upper side edge portion 421 versus a larger lower side edge portion 422. This outer configuration of badge base 401 is also related to engagement with a badge holder but provides a unique and recognizable outer shape which can be used for automated handling, orientation and opening in dosimeter reading apparatuses (not shown).

FIG. 30 shows that the badge insert or second part 402 is advantageously shaped in a generally circular arrangement to form a disk. The top or exterior face of the second part 402 is advantageously provided with a label mounting recess 425 for protecting any badge label mounted thereon. The outer periphery of the badge insert 402 has a plurality, namely three (3), longitudinal peripheral recesses 426–428, which allow automated dosimeter handling equipment or other suitable tool to be inserted into the recesses to enable turning of the insert disk 402 with respect to base 401 and allow automated removal and handling of the insert disk. The bottom face 405 includes two recesses 430 advantageously included for limiting the amount of radiation attenuation which occurs to two dosimeters mounted within the badge adjacent to the recesses 430. Recesses 430 are also advantageous for molding purposes and are further usable for outer case recognition in automated handling of the badge.

Figure 38:
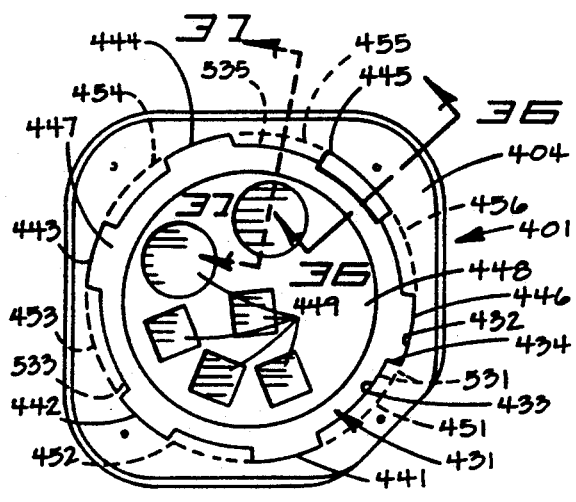
FIG. 38 is a top plan view showing the base portion of the dosimeter badge of FIG. 30.

FIG. 38 shows the base portion 401 of dosimeter badge 400 from the top face 404. The top face is provided with an insert or second part opening or receptacle 431. Receptacle 431 has a distinctive peripheral opening shape defined by a major circle 432 and minor circle 433. the major and minor circle portions of the opening periphery are connected by joining segments which are approximately radial. As shown, receptacle opening 431 has six (6) major circle peripheral sections 441–446. Conversely, receptacle 431 also has six (6) minor circle peripheral sections 451–456. The minor and major circle sections are designed to have differing circular segment sizes or otherwise asymmetrically shaped to provide only a single installation position for the insertion of the second badge part 402. A number of different geometrical configurations are possible.

FIG. 38 also shows that the insert receptacle 431 has a bottom surface 448 which is generally planar but provided with a number of distinct regions. Regions 449 are recessed areas which have differing depths to provide varying case thicknesses. The differing case thicknesses are used as effective radiation filters of differing radiation attenuation. Alternatively, the recesses 449 can be provided with special filtering, reflecting or other radiation affecting properties which are useful in controlling the radiation sensed by the radiation dosimeters which will be described in greater detail below.

FIG. 38 further shows that the receptacle bottom surface 448 also includes a sealing region 447 which is an annular band slightly raised above the inward portions of the bottom surface. A flexible seal 480 (see FIG. 39) seals against the sealing region to enclose and protect the dosimeters held by the badge.

Figure 39:
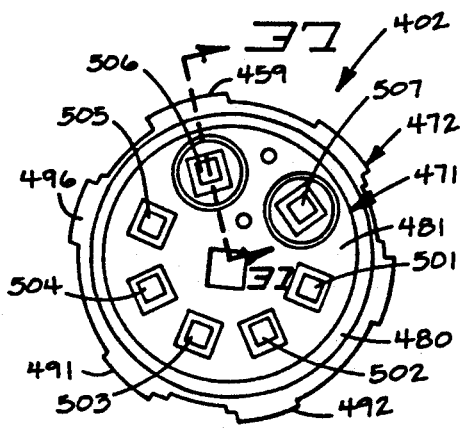
FIG. 39 is a plan view showing the interior face of the insert disk forming a part of the dosimeter badge shown in FIG. 30.
Figure 40:
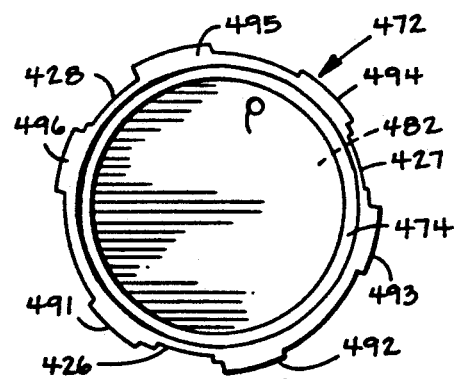
FIG. 40 is a plan view showing in isolation an exterior piece component of the insert disk shown in FIG. 39.
Figure 42:
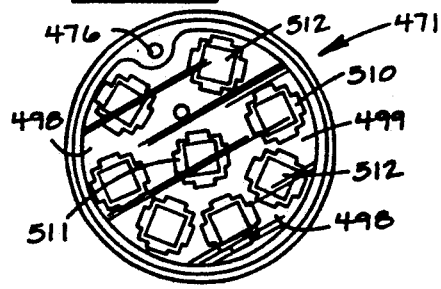
FIG. 42 is a plan view showing in isolation a concealed face of an interior piece component forming a part of the insert disk shown in FIG. 39.
Figure 43:
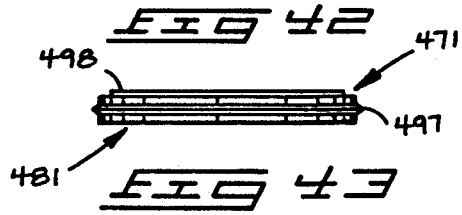
FIG. 43 is an edge view of the component shown in FIG. 42.

FIG. 39 shows the insert assembly 402 in isolation and viewed from the interior side 481. The insert assembly 402 is advantageously constructed using two insert pieces, an interior insert piece 471 and an exterior insert piece 472. FIG. 40 shows the exterior insert piece 472 in isolation. FIGS. 42 and 43 show the interior insert piece 471 in isolation.

The insert exterior piece 472 has an enclosed face 473 and an exterior face 482 which is exposed as the top face of the insert, as shown in FIG. 30. The enclosed face is substantially planar with an outer raised band 474 formed near the edge to axially position the seal 480 and radially position the insert interior piece 471. The enclosed face 473 also includes a orientation-fixing pin 475, which mates with an orientation-fixing aperture 476 formed in the insert interior piece 471.

The insert exterior piece 472 is also defined about the periphery by a shape which can fit into the unique receptacle opening 431 of the base 401 as described above. The insert exterior piece has peripheral minor circle surfaces 490 (FIG. 41) which in general are cylindrical along a minor circle diameter which is slightly less in diameter than the diameter of the minor circle portions 441–446 of the receptacle opening 431. The periphery of the insert piece 472 also has outwardly projecting major diameter portions 491–496 which are appropriately shaped and sized to mate with the major circle sections 441–446, respectively.

Figure 41:
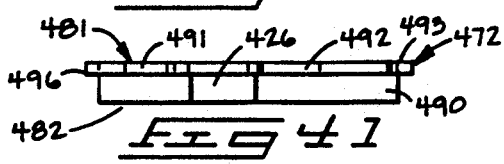
FIG. 41 is an edge view of the insert disk shown in FIGS. 39 and 40.

FIG. 41 shows the insert exterior piece 472 in edge view with the major circle portion projections adjacent the interior surface 481 and the minor circle surface portions 490 toward the exterior surface 482. FIG. 41 also shows recessed slot 426 along the outer periphery.

FIG. 39 shows that the badge insert 402 advantageously mounts a plurality of dosimeters 501–507 along the interior side 481. The dosimeters can be of a variety of types of radiation dosimeters, preferably of construction as taught in this document or as otherwise needed for the particular radiation dose measuring project involved. The dosimeters 501–507 are advantageously mounted in the insert interior piece 471. The preferred construction of piece 471 and such mountings include dosimeter mounting receptacles 510 which advantageously include a planar shape as shown in FIG. 42 with a defined antirotational prism-receiving capability such as shown. The dosimeter mount receptacles 510 also include clearance slots along each to aid in installation and removal of mounting blocks 512. The dosimeter mount receptacles 510 further advantageously include an opening flange 511 (see also FIG. 37) which acts as a retaining lip about the interior face opening of the receptacles 510. The dosimeters 501–507 rest on the flanges 511. The dosimeter mounts also preferably include support blocks 512 which are advantageously prismatic and shaped to be non-rotationally received within the receptacle 510. The support blocks 512 support the dosimeters to maintain their positions adjacent the interior surface 481. The dosimeters are advantageously held in thermally isolating dosimeter frame or mounting constructions, such as described elsewhere herein, to prevent substantial contact and reduce heat transfer between the support blocks and the dosimeters. The support blocks are held longitudinally in position within the receptacles 510 using a suitable support block holder, such as a layer 498 of strong, lightweight polymer (Mylar) which is adhesively contacted against the enclosed face 499 of insert interior piece 471 (see FIG. 42).

Figure 37:
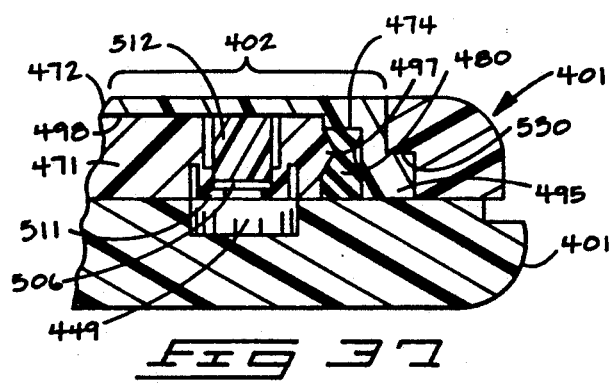
FIG. 37 is an enlarged partial sectional view taken along line 37—37 of FIG. 30.

FIGS. 37 and 43 also show that the interior insert piece 471 advantageously is provided with a peripheral surface which is adapted to mount the seal 480. The peripheral surface is adapted by forming a ridge 497 thereabout. The ridge is received within the specially shaped annular seal 480. Seal 480 is preferably an elastomeric material which is resilient under the contacting forces developed between the mating first and second parts 401 and 402 of the dosimeter badge. Seal 480 is mounted between the interior and exterior insert pieces as most clearly indicated in FIG. 37. Seal 480 acts to hold the two parts of the insert together as well as providing a barrier against moisture and contamination.

Figure 36:
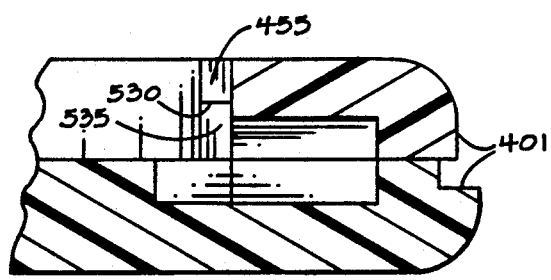
FIG. 36 is an enlarged partial sectional view taken along line 36—36 of FIG. 38.

Dosimeter badge 400 is used by mounting appropriate dosimeter types as indicated above within the insert piece 402. The insert piece is then installed within the insert receptacle 431 by aligning the corresponding major diameter projections 491–496 with the corresponding major circle sections 441–446. The insert 402 is then inserted downwardly into the receptacle with the interior face 481 into the receptacle. The disk shaped insert is then turned counter-clockwise as viewed in FIGS. 30 and 38. The counter-clockwise rotation causes the major diameter projections of the insert disk to pass beneath corresponding axial retaining surfaces 530 (see FIG. 36) formed by the downwardly-facing surfaces of the overhanging minor circle sections 451–456 of the base 401. Leading edges of the peripheral projections on the disk stop against stops 531, 533, and 535 beneath a limited portion of the overhanging sections 451, 453, and 455, respectively. In such a fully installed position the dosimeters 501–507 are installed adjacent to their desired filter or other radiation-affecting recess 449.

Dosimeter badge 400 is advantageously adapted for automated handling and reading. An automatic dosimeter reader takes the assembled badge and rotates the insert 402 clockwise relative to base 401 as shown in FIG. 30. This operation is advantageously accomplished by inserting a rotatable tool with prongs which extend into the peripheral slots 426–428. After the insert disk is rotated into the clockwise released position, the disk is pulled from the base using any suitable device. The removed insert disk is then appropriately handled to place the interior face of the insert in position for reading using a suitable dosimeter reader, such as the laser reader described in issued U.S. Pat. No. 4,638,163. The dosimeters which have been read can then be annealed by laser annealing as explained in such patent, and thus prepared for reuse. The read and annealed dosimeters can then be reinstalled in the dosimeter badge and distributed for wearing by personnel or otherwise placed for monitoring radiation dose information.

FIGS. 44–48 show another preferred dosimeter badge 550 according to this invention. Dosimeter badge 550 is constructed using two major parts, a first part or base assembly 551 and a second part or insert assembly 552. Badge parts 551 and 552 are adapted for securement together into a dosimeter badge assembly which is advantageously adapted to enclose a sealed dosimeter mounting and containment area. Badge 550 has a top or insert mounting face 554 and a bottom or back face 555. The planar shape of the dosimeter badge includes four side edges 561–564 which are generally square in basic shape. The rear or third side edge 563 is connected by a 30° diagonal corner 565 to the fourth or right side edge 564. The square shape and 30° diagonal corner provide a unique shape for automated equipment recognition purposes. The left or second side edge 562 is connected to the front side edge 561 at a rounded corner 566. Similar rounded corners 567 and 568 are between the second and third side edges 562 and 563, and first and fourth side edges 561 and 564, respectively. The outer periphery of the badge 550 has an edge or side wall 569 with a shoulder 570 and reduced-size bottom side wall portion 571. Shoulder 570 and reduced side wall portion 571 provide secure engagement with badge holder 800 as described below. The bottom surface 555 is advantageously provided with a contoured recess 572 to provide desired thickness of the case for a particular level of radiation filtering or other radiation-affecting purpose. Recess 572 also reduces distortion when produced by molding and can further be used to provide surface recognition if desired for such automated handling.

FIG. 51 shows that badge part 551 includes an insert receptacle 653 which receives the insert assembly 552 therein. The combined dosimeter badge 550 can advantageously be held in a badge holder 800 which will be further explained below.

FIG. 44 also shows that the badge insert assembly or second part 552 is advantageously shaped in a generally circular arrangement to form a disk. The top or exterior face 632 of second part 552 is advantageously provided with a label mounting recess 575 for receiving and protecting any visual badge label mounted thereon. Two indentations 574 are provided for engagement by an automated dosimeter reading device to assist in maintaining the rotational position of the disk while a locking ring 600 (see FIG. 50) is turned relative to the base 551 and insert 552 to release and retain the insert assembly with the base assembly as will be explained in greater detail below.

The exterior surface 632 of the insert is also advantageously adapted to mount an electronic memory device 640. The electronic memory device is advantageously a suitable type of electronically erasable programmable read only memory device which are known in the art and commercially available. Suitable forms of electronic memory devices for incorporation in dosimeters according to this invention are illustrated by the disclosures in one or more of U.S. Pat. Nos. 3,971,916; 4,007,355; 4,092,524; and 4,102,493; which are hereby incorporated by reference in their entirety. The electronic memory device includes eight (8) electrical contacts 641 which are engaged by suitable electrically conductive members for powering the memory chip and reading stored information therefrom. The memory chip advantageously includes information about the calibration factors for each dosimeter element, the date last read, a serial number or other identifier, the type of dosimeters included in the badge, and any other relevant information desired in connection with the reading and interpreting of dose exposure information from the dosimeters of badge 550.

Figure 50:
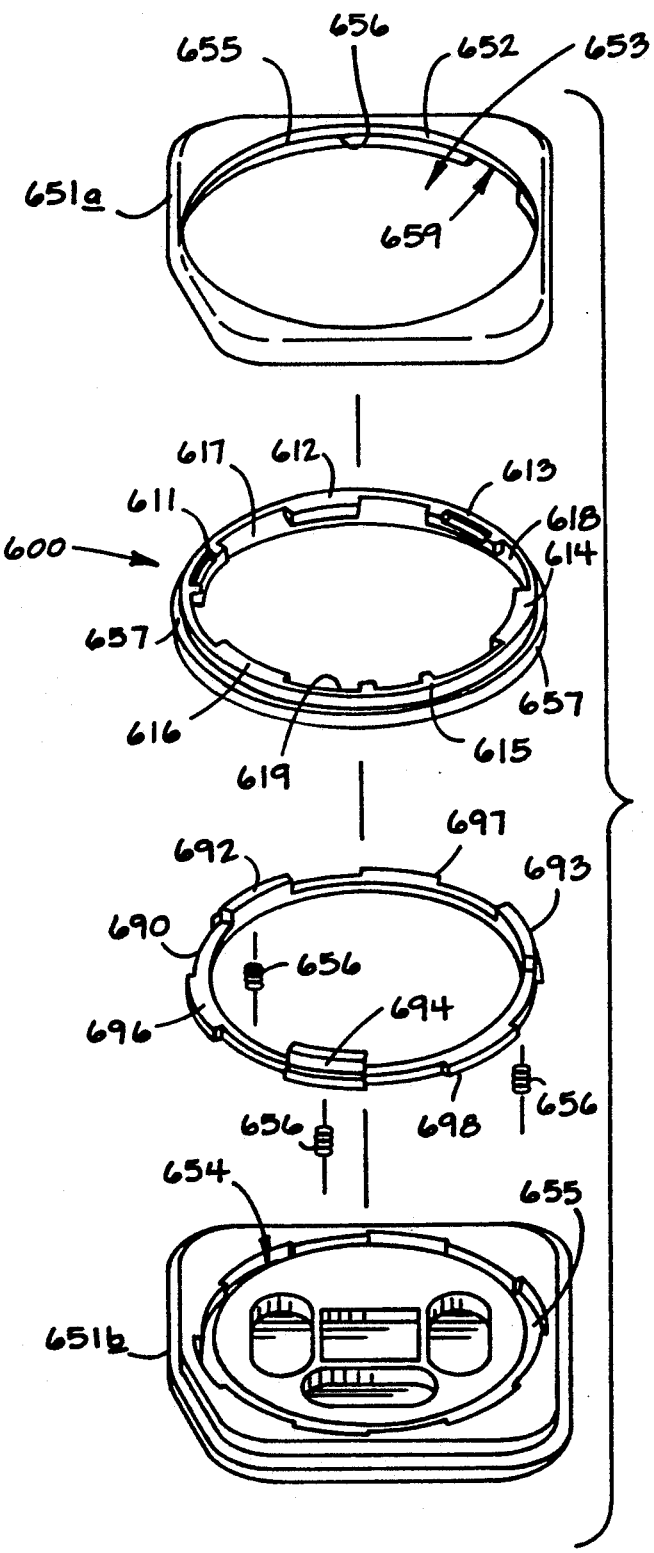
FIG. 50 is an exploded assembly view showing the base assembly forming a part of dosimeter badge of FIG. 44.

FIG. 50 shows the base assembly 551 in an exploded view to detail the components advantageously included. Base assembly 551 includes a base case 651 which is advantageously made in two pieces for molding purposes, a top face base piece 651a and a bottom face base piece 651b. The top and bottom base pieces are permanently bonded together capturing the locking ring, tamper ring and tamper springs. The top piece 651a includes an insert receptacle opening 652 which defines portions of the base case insert receptacle 653. The peripheral walls of the base case receptacle defined by the top face piece has an upper portion 655 with a diameter which is less than the diameter of a groove portion 656. This stepped arrangement for the upper part of the insert receptacle is designed to retain the locking ring 600 in axial position within the base. The locking ring has a corresponding stepped outer peripheral surface 657.

FIG. 50 also shows that the base assembly 551 advantageously includes an optional tamper-resistant means which is shown in a form which utilizes a tamper ring 690. Tamper ring 690 is received within the bottom of the insert receptacle 653, within a specially shaped tamper ring groove 654. The bottom surfaces of the tamper ring groove are provided with spring receptacles in the form of small cylindrical indentations 655. The spring receptacles receive very small compression type tamper springs 656 which are used to bias the tamper ring upwardly from the bottom of the insert receptacle toward the opening 652. In certain tamper-resisting locking positions of the movable locking ring, the tamper ring prongs 692-694 extend into spaces 617-619, respectively, between the inwardly overhanging extensions 611-616. This allows the tamper ring locking prongs 692-694 to move upwardly to angularly lock the locking ring at a locking position in which the insert assembly is held within the receptacle 653 in a tamper-resistant locked condition. The locking ring is unlocked by inserting a tool, preferably having three (3) prongs into the annular slots between the insert assembly periphery and the inside wall of the locking ring to engage upper surfaces of the tamper ring locking prongs 692-694 and depress the tamper ring downwardly to release the locking ring for limited angular travel.

Figure 58:
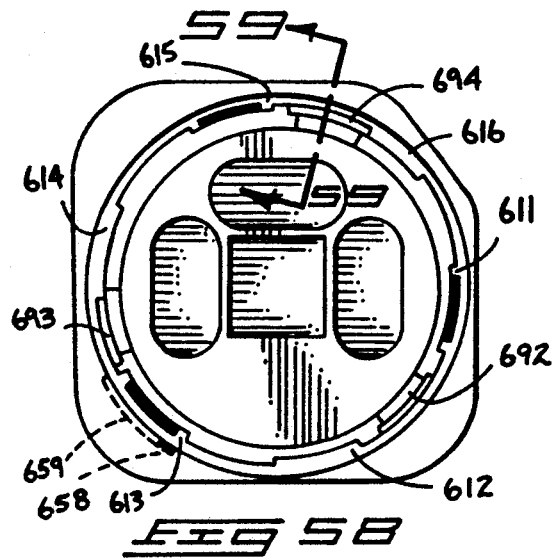
FIG. 58 is a view similiar to FIG. 56 showing the lockng ring held within the dosimeter base rotated to a position different to that shown in FIG. 56 to illustrate the engagement of the locking ring by the tamper ring.

FIG. 50 also shows that the base case 651 is provided with a locking ring limit groove 659 (see also FIG. 58). Limit groove 659 is adapted to receive an angular travel limit projection 658 (see FIG. 60) to extend thereinto. Limit groove 659 is about 35° of arc, sufficiently long to allow angular travel of the locking ring 600 of about 30° of arc, as the ring rotates within the receptacle confined radially by surfaces 655 and 656.

FIGS. 52-59 further illustrate the construction and interaction of the tamper-resisting mechanism provided by the base case 651, locking ring 600, and tamper ring 690. FIGS. 52 and 53 show the case base 651 without either the tamper ring 690 or the locking ring 600 installed. The tamper ring groove is provided with lateral recesses 682-684 for receiving laterally extending bosses 692a, 693a, and 694a on the tamper ring (see FIG. 65). Similarly, the tamper ring groove 654 includes additional lateral extensions 686-688 for receiving tamper ring lateral bosses 696-698, respectively. The unique engagement so provided between the tamper ring groove 654 and the tamper ring 690 prevents rotation of the tamper ring when it is installed in the groove and held in place by the overlying locking ring 600. The tamper ring thus installed prevents rotation of the insert assembly.

The base case also includes a receptacle central floor zone 661 defined within the tamper ring groove 654. The central floor is advantageously provided with appropriate recesses 701-704 which define the thickness of the case at selected locations adjacent dosimeters to provide desired radiation affecting properties. The recesses also allow installation of radiation affecting filters (not shown) therein. In general the depth of the recesses 701-704 vary.

FIGS. 54 and 55 show the base case in combination with the tamper ring 690 which is installed in the tamper ring groove 654. The tamper ring is upwardly biased by springs 656, as shown in that FIG. 55.

Figure 56:
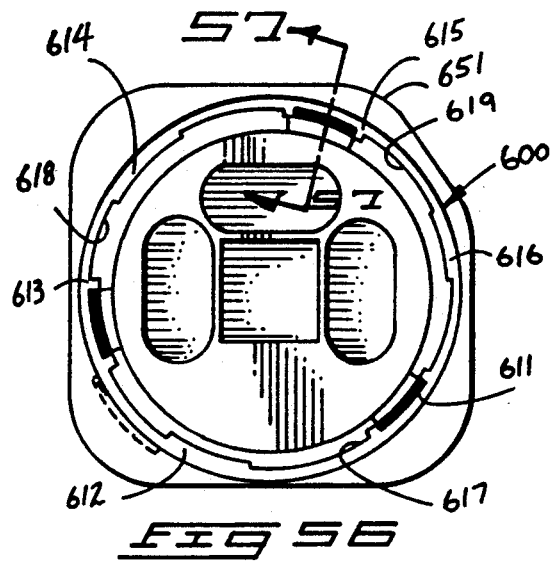
FIG. 56 is a view similar to FIG. 54 with an additional installed locking ring shown in the case portion of the base assembly.
Figure 57:
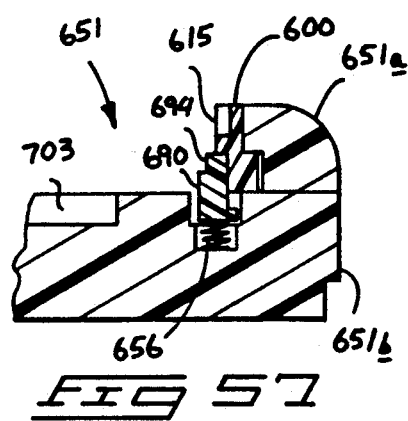
FIG. 57 is an enlarged partial sectional view taken along line 57—57 of FIG. 56.

FIGS. 56 and 57 shows the base assembly 551 in a further state of assembly which includes both the tamper ring and locking ring 600 installed therein. The tamper ring prong 694 is held down by locking ring interior extension 615 thus keeping the tamper ring in the retracted unlocked position.

Figure 59:
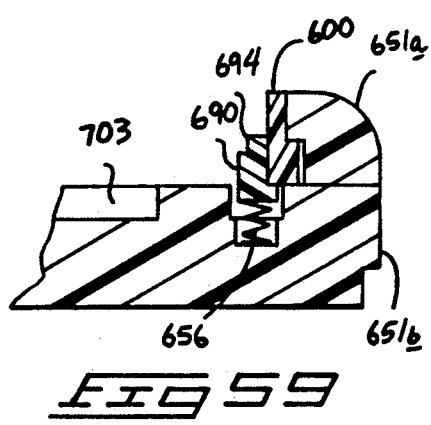
FIG. 59 is an enlarged partial section view taken along line 59—59 of FIG. 58.

In FIGS. 58 and 59 the locking ring 600 is shown rotated counterclockwise about 30° of arc to displace the extension 615 from above prong 694. Similar displacements also occur with respect to the other interior extension of the locking ring 611 and 613 which move from their overlying positions upon tamper ring prongs 692 and 693. This in turn allows the tamper ring to move axially upward to position prongs 692, 693 and 694 along locking ring surface spaces 617, 618 and 619, respectively. Thus the tamper ring engages and locks the locking ring in angular position.

FIGS. 60-64 show the locking ring 600 in isolation with the features explained hereinabove. FIGS. 65-67 similarly show the tamper ring 690 in isolation with the features explained hereinabove.

Figure 68:
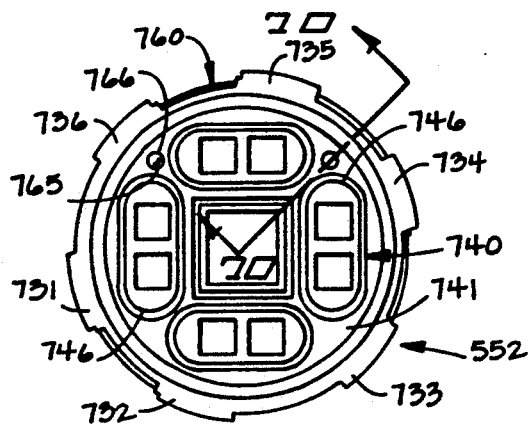
FIG. 68 is a plan veiw showing the interior face of an insert assembly forming a part of the dosimeter badge of FIG. 44.
Figure 71:
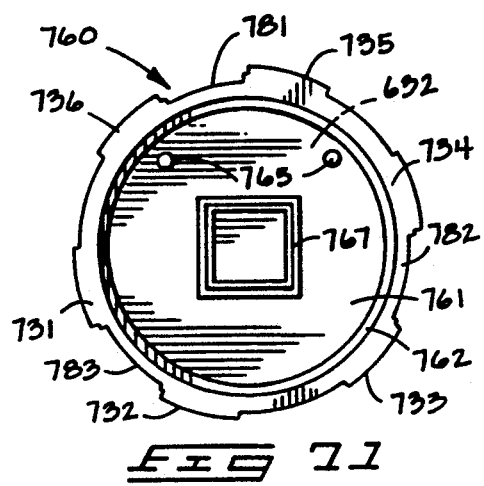
FIG. 71 is a plan view showing a concealed face of an exterior piece component forming a part of the insert assembly shown in FIG. 68.
Figure 69:
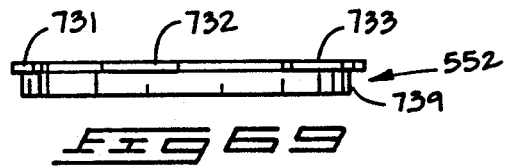
FIG. 69 is an edge view of the insert assembly shown in FIG. 68.
Figure 72:
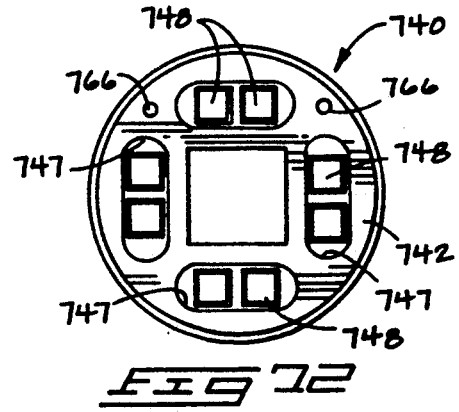
FIG. 72 is a plan view of a concealed face of an interior piece component forming a part of the insert assembly shown in FIG. 68.
Figure 73:
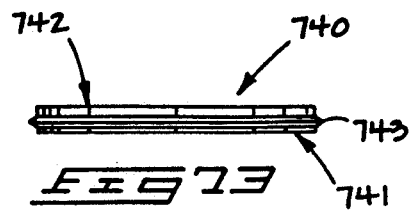
FIG. 73 is an edge view of the component shown in FIG. 72.

FIGS. 68 and 69 show the dosimeter badge insert or second part assembly 552. The insert assembly 552 includes two main pieces, namely, an interior insert piece 740 and an exterior insert piece 760. FIG. 71 shows the exterior insert piece in isolation, and FIGS. 72 and 73 show the interior insert piece in isolation.

Figure 70:
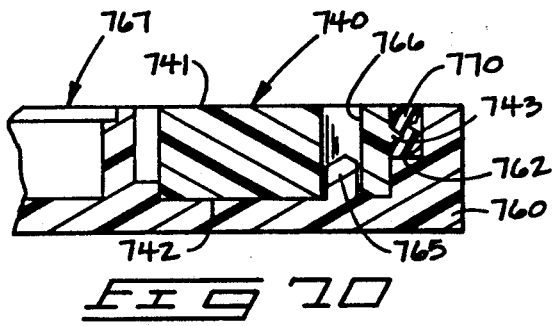
FIG. 70 is a sectional view taken along line 70—70 of FIG. 68.

The exterior piece 760 has an enclosed face 761 and an exterior face 632. The enclosed face is substantially planar with an outer raised band 762 formed near the edge of the enclosed face for supporting a seal 770 (see FIG. 70). The enclosed face also advantageously includes two raised studs 765 which are used to correctly position the interior piece 740 in correct relationship. The studs 765 are received in apertures 766 formed in the interior piece. The enclosed face of the exterior piece 760 also advantageously includes a neutron dosimeter receptacle 767 for mounting a fast neutron dosimeter, such as described in the co-pending U.S. patent application Ser. No. 336,015, incorporated by reference hereinabove. The receptacle has an outer shoulder which provide a space for installing any desired lateral radiation shield or radiation affecting filter.

The exterior piece 760 is further defined about its outer periphery by a plurality of outwardly projecting major diameter portions 731-736 which are appropriately shaped and sized to mate with corresponding major circle sections defined by the interior of the locking ring 600. For example, projection 734 fits into section 618, and portion 736 fits into section 619. When the insert assembly 552 is fully installed the projections 731-736 are overpositioned by the locking ring inward projections 611-616, respectively. The locking ring projections move relative to the stationary insert assembly by sliding along a substantially cylindrical portion 739 (see FIG. 69). The insert assembly 552 does not rotate within the insert receptacle, instead the locking ring is rotated from an open position which is relatively clockwise, as shown in FIG. 56, into the holding position which is relatively counter-clockwise, as shown in FIG. 58. The tamper ring 690 is not mandatory for the holding function by locking ring 600 on the insert assembly, and the tamper ring can be omitted. If omitted it is preferable to include some other means for fixing the angular position of the insert assembly when installed in the base, such as by including a suitably shaped receiving groove (not shown). If included, the tamper ring extends the locking prongs to lock the locking ring as explained hereinabove, and also holds the insert in fixed angular position.

To remove the insert assembly the reverse process is used. If included, the tamper ring prongs are depressed at the peripheral slots 781-783 which are immediately adjacent to the prongs of the tamper ring. The depressed prongs of the tamper ring allow the locking ring to be rotated clockwise and into the open position of FIG. 56. The inward projections 611, 613 and 615 are specifically adapted with pocket-shaped upper surfaces for receiving a turning tool to rotate the locking ring. The insert assembly is then removed from the insert receptacle by axial upward motion. The removed insert assembly can then be positioned for laser reading of the luminescent dosimeters mounted along the interior face of the insert assembly interior piece 740.

The insert assembly interior piece 740 is a substantially disk-shaped item having an exposed interior face 741 shown in FIG. 68, and an enclosed face 742 shown in FIG. 72. The peripheral edge of this piece includes a raised rib or ridge 743 which aids in the installation and positioning of the seal 770 (see FIG. 70). Seal 770 and the complementary fitting of the interior and exterior pieces 740 and 760 act to hold the two together as the insert assembly, together with mounted dosimeters.

As shown, the interior piece 740 is constructed with eight dosimeter openings 748 which are formed within four dosimeter mounting receptacles 747. The mounting receptacles 747 are surrounded on the exposed face by filter receiving grooves 746 (see FIG. 68). Dosimeter openings 748 have thin flanged edges which surround and hold a dosimeter or dosimeter assembly including any associated dosimeter frame or mounting device such as described elsewhere herein. The dosimeters are not shown installed in FIGS. 68 or 72, but can be installed in substantially the same manner as described in connection with FIGS. 80-93, and as explained elsewhere in this document.

FIGS. 74-79 show a preferred form of dosimeter badge holder 800 which is useful in holding dosimeter badge 550, particularly for wear by a person being monitored for radiation dosage. Badge holder 800 also protects the dosimeter badge against contamination. The badge includes a front face 801 which is shaped to serve as a cup-shaped receptacle 804 defined by a perimetric side wall array and a receptacle bottom surface 803. The perimetric side wall array is shaped to form a continuous wall which engages the side peripheral surfaces of the dosimeter badge 550 in an interference fit which retains the dosimeter badge within the receptacle 804 in a unique orientation relative thereto. The badge 550 is provide with an outer peripheral step 570 which engages with a raised rib 809 formed along the outer edge of the perimeter side wall. The badge 550 thus fits substantially within the cup-shaped receptacle 804 and is protected therein. The bottom surface 555 of the dosimeter badge faces outwardly across the opening of the badge holder when installed therein. The badge holder is provided with a relatively clear panel 816 which allows viewing of the dosimeter badge label through the badge holder.

FIGS. 74-79 further show that the back surface 810 of the dosimeter badge holder is advantageously provided with suitable means for attaching the badge holder to apparel of a wearer. The first apparel attachment feature is a pair of integrally formed belt loops 821 and 822. The badge holder can be threaded onto a wearer's belt and held securely during the course of wear.

FIGS. 74-79 also show a second apparel mounting device 840. Mount 840 consists of a integrally formed, such as molded, loop 841. A lanyard and alligator clip (not shown) can be affixed to the loop 841 and used to clip the entire dosimeter badge and holder assembly to the apparel of a wearer.

The dosimeter badge holder 800, and dosimeter badges 400 and 550 are advantageously made of any suitable material such as a tissue-equivalent plastic. A suitable material is ABS plastic others will also be appropriate. The parts are preferably molded of such material in the indicated shapes and then assembled together. Other alternative fabrication techniques are also possible.

Figure 80:
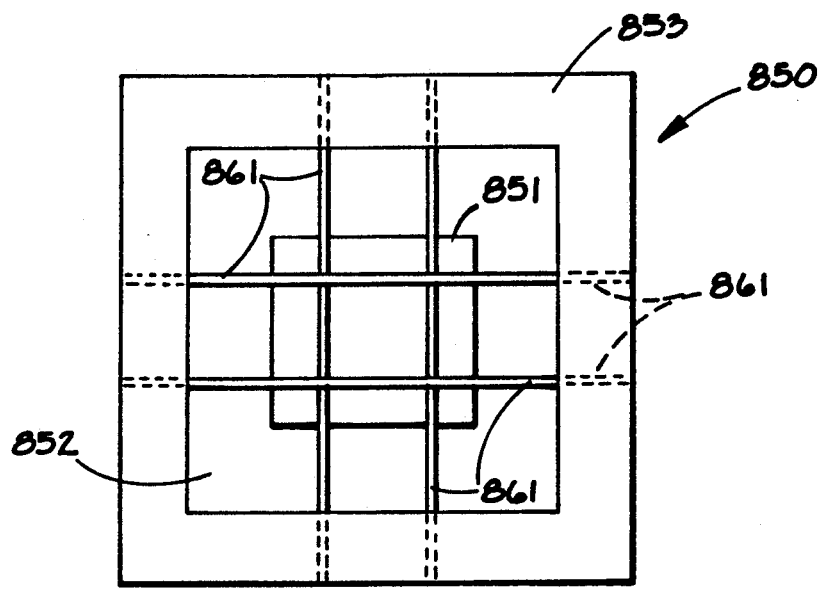
FIG. 80 is a top plan view showing a preferred mounting structure according to this invention used to hold a thermoluminescent dosimeter chip for mounting in dosimeter badges, such as described herein.

FIG. 80 shows an advantageous mounting arrangement for holding novel dosimeters made in accordance with this invention and discrete luminescent phosphor chips, such as made from lithium fluoride and other materials. Mount 850 as shown is supporting such a chip 851. Dosimeter chip 851 is loosely positioned on a layer or film 852 of temperature-resistant polymer such as a synthetic resin polyimide material sold under the trademark Kapton. The polymer film is preferably coated with a reflective metallic coating which is advantageously adjacent to the chip 851. Overlying the chip is a plurality of fine metal wires 861 which extend across to hold the chip from lateral and upward displacement. The wires are advantageously 1-5 mil, more preferably 1-2 mil in diameter. About the marginal edge of the mount 850 is another superjacent layer of Kapton 853 formed as a marginal annular band which is adhesively bonded to the layer 852 and the interpositioned wires 861 to hold these components and the chip 851 together as an assembly.

Figure 81:
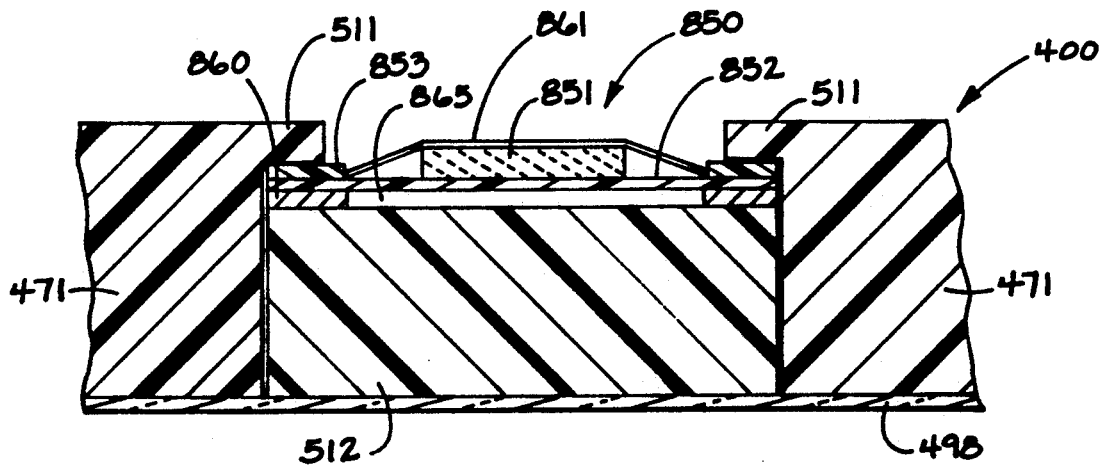
FIG. 81 is a sectional view showing the dosimeter mounting structure of FIG. 80 installed within the dosimeter badge shown in FIG. 30.

FIG. 81 shows the dosimeter mounting assembly 850 held in a fully mounted position within the dosimeter badge 400 such as shown in FIG. 37, in lieu of dosimeter assembly 506. The assembly 850 is retained by the ledges 511. A thermal isolation spacer 860 shown in FIG. 83 has a thermal isolation opening 865 which provides an insulatory void beneath the plastic layer 852 to thermally isolate the layer and prevent substantial heat transfer from the dosimeter chip being heated. A spacer block 512 and retaining backup layer 498 hold the dosimeter mounting assembly in position as explained hereinabove.

Figure 82:
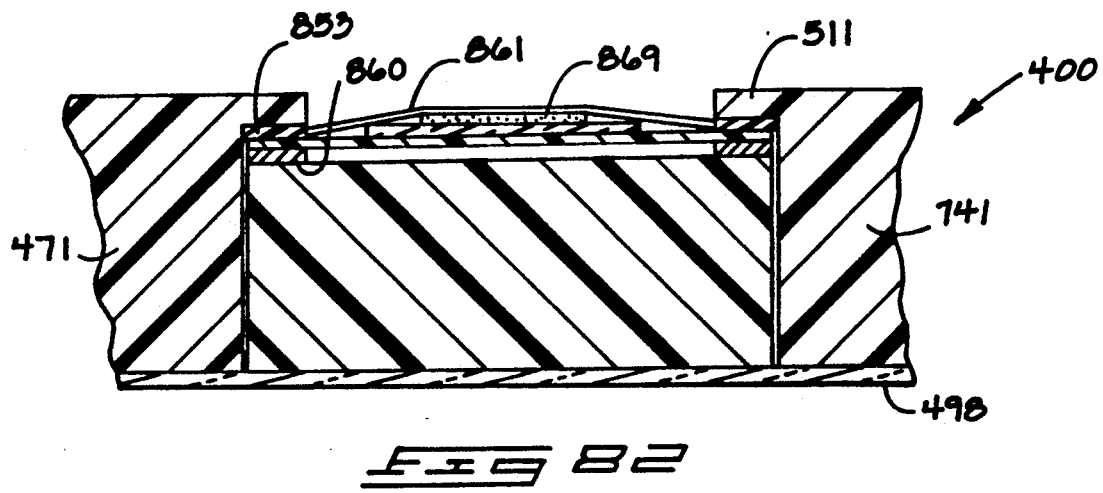
FIG. 82 is a sectional view showing a dosimeter mounting assembly similar to FIG. 81 except that mounting structure is used to hold a dosimeter as shown in FIG. 1.
Figure 83:
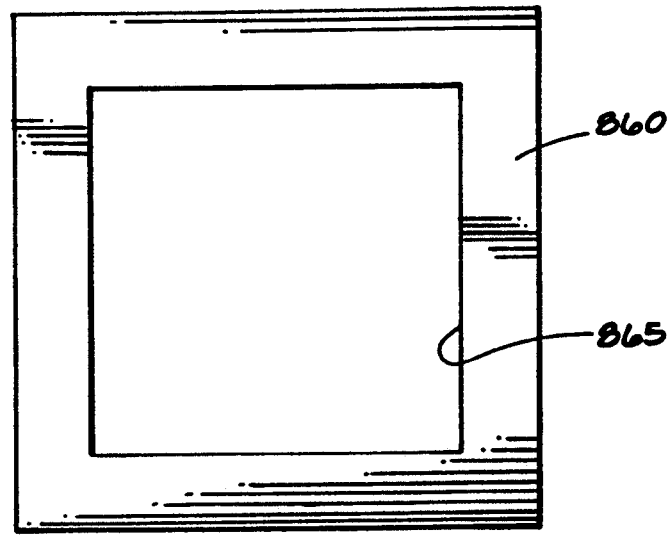
FIG. 83 is a plan view showing a dosimeter mounting spacer included in the mounting structure shown in FIGS. 81 and 82.

FIG. 82 shows a mounting the same as shown in FIG. 81 with a glass substrate and printed dosimeter 869 using a polymeric binder as described below. Dosimeter 869 is mounted in lieu of the thermoluminescent phosphor chip 851 as shown in FIG. 81.

Figure 84:
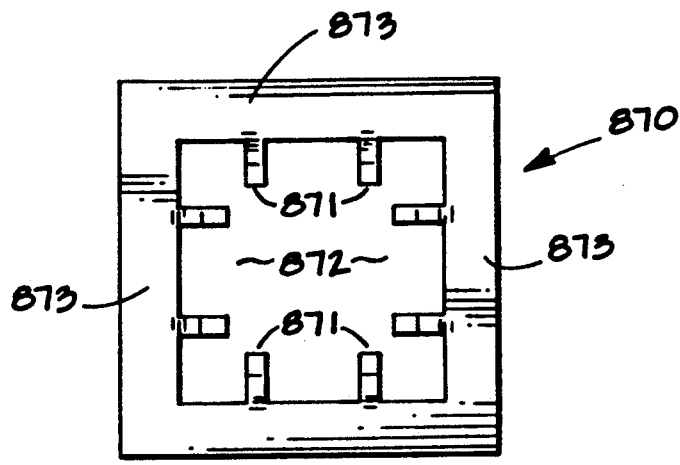
FIG. 84 is a top plan view showing an alternative dosimeter mounting retainer made in accordance with this invention.
Figure 85:
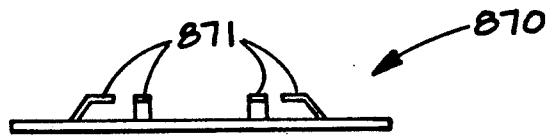
FIG. 85 is a front edge view showing the dosimeter mounting retainer of FIG. 84.

FIG. 84 shows a dosimeter mounting structure 870 according to this invention. Mounting structure or retainer 870 includes a marginal band 873 which extends in a square annular shape about an interior opening 872. A plurality of dosimeter engaging prongs 871 extend inwardly and upwardly arched relationship from the marginal band and are preferably integrally connected with the marginal band, such as by forming from the same layer of material. The unit is preferably fabricated as a flat piece and then formed into the shape shown in FIGS. 84 and 85. The prongs 871 hold a dosimeter within the interior opening 872 thereby mounting the dosimeter in a thermally isolated manner which reduces laser heating time and energy requirements. The dosimeter mounting retainer 870 is made of a suitable material, such as a thin metal, preferably stainless steel. The mounting retainer are advantageously made by a chemical photoetching process.

Figure 86:
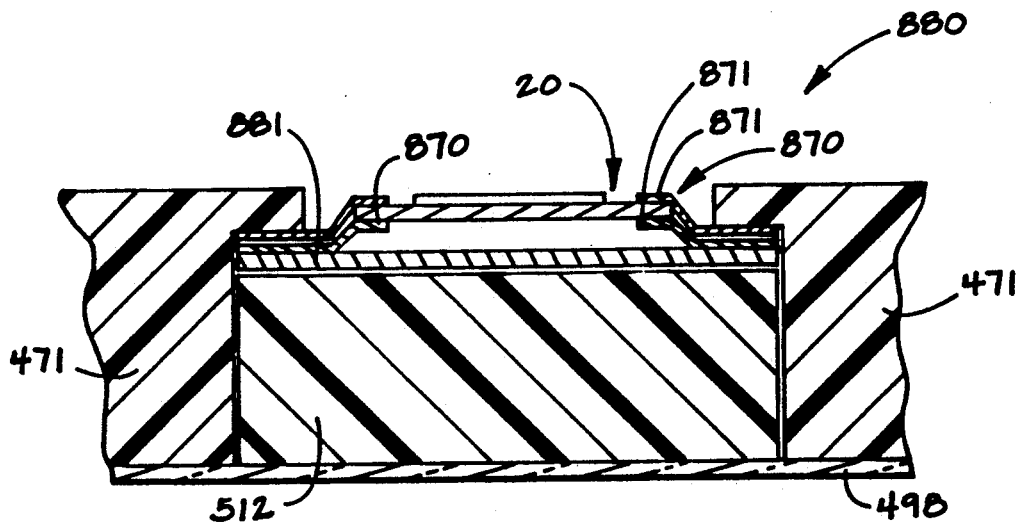
FIG. 86 is a sectional view showing a dosimeter mounting structure which incorporates two retainers as shown in FIG. 84 mounted within the dosimeter badge shown in FIG. 30.

FIG. 86 shows a novel dosimeter mounting arrangement 880 which utilizes two of the mounting retainers 870, one on each side of dosimeter 20. The mounting 880 also preferably uses a thin film of plastic 881 which is positioned in a spaced relationship from the elevated dosimeter 20 and the prongs 871 of the underlying retainer 870. The spaced relationship is important in reducing heat transfer from the dosimeter 20 and minimizing laser heating time and power requirements. The plastic or other film 881 is preferably coated with a reflective layer (not specifically shown) along the upper surface or is made from a reflective material which causes the heat developed in dosimeter 20 during laser heating to be reflected back toward the dosimeter thereby aiding in the laser heating process and minimizing time and energy which must be input by the laser beam. The reflective layer 881 also preferably is reflective to the wavelength of luminescent emission which is being induced by the laser heating thereby assisting in the readout of the luminescent dosimeter information with a minimum of emission loss. The dosimeter mount 880 can be used to mount luminescent phosphor chips, and other dosimeters, such as described elsewhere herein.

FIGS. 87 and 88 show a further preferred embodiment of dosimeter mounting retainer 890 according to this invention. Dosimeter mounting retainer 890 includes a marginal band 891 which extends about a central opening 892. The marginal band is advantageously square but can assume other alternative shapes and configurations. Extending across the central opening is a pair of retainer bands 893. The retainer bands are flat in the plane of the marginal band as shown in FIGS. 87 and 88, but will assume extending positions as indicated in phantom in FIG. 88 when installed and deformed about a dosimeter. The retainer bands are preferably formed with a easily deformable connection at each end where the retainer bands connect with the marginal band 891. This is advantageously accomplished by providing a joinder section 894 which extends inward from the marginal band, such as at approximately orthogonal orientations. A sidebar portion 895 is connected to the joinder section and is adapted to angle along the side of a dosimeter as will be explained more fully below in connection with FIG. 92. The retainer bands 893 further include central connecting portions 896 which connect between the sidebar portions of the opposing ends of the retainer bands. The retainer bands are designed to easily deform about a dosimeter when installed as explained below.

FIG. 89 shows a further novel dosimeter mounting retainer 900 of this invention. Dosimeter mounting retainer 900 is adapted for use with retainer 890 to form a novel mounting combination which is shown in FIG. 91. FIG. 89 shows that dosimeter retainer 900 includes a perimeter band 901 which substantially defines a central opening 902. The perimeter band is advantageously provided with beveled interior corners 903 which are adapted to support the corners of a dosimeter thereon. The retainer further includes two inwardly directed dosimeter tabs 904 which are advantageously bent upwardly as shown in phantom in FIG. 90. When so positioned the tabs 904 serve to laterally restrain a dosimeter positioned over the central opening within the opposing set of tabs.

FIG. 89 also shows that the retainer 900 preferably includes outer tabs 906 which are intended to be bent over an overlying retainer 890 to secure the retainers 890 and 900 together about a dosimeter to hold the dosimeter in position. FIG. 91 shows such a combined dosimeter and dosimeter mounting construction 910 which is also shown installed in dosimeter badge 400 in FIG. 92. The dosimeter mount 910 includes an upper dosimeter retainer 890 and a lower dosimeter retainer 900, each as described above. The dosimeter lateral locating tabs 904 are in the upright position to laterally restrain the thermoluminescent chip 920 mounted therein. The lower retainer tabs 906 are bend up and over the marginal portion 891 of upper retainer 890 to secure the retainers 890 and 900 together about phosphor chip 920. The C-shaped retainer bands 893 are deformed over and along the side edges of the dosimeter chip at an angle relative to the plane of the marginal portions. The joinder sections 894 twist to allow such deformation and the sidebar portions 895 of the retainer bands extend along the edges of the dosimeter chip to laterally restrain the chip against movement, left or right as shown in FIG. 91. The tabs 904 of the lower retainer 900 restrain lateral motion in the orthogonal direction, up and down as shown in FIG. 91.

Figure 92:
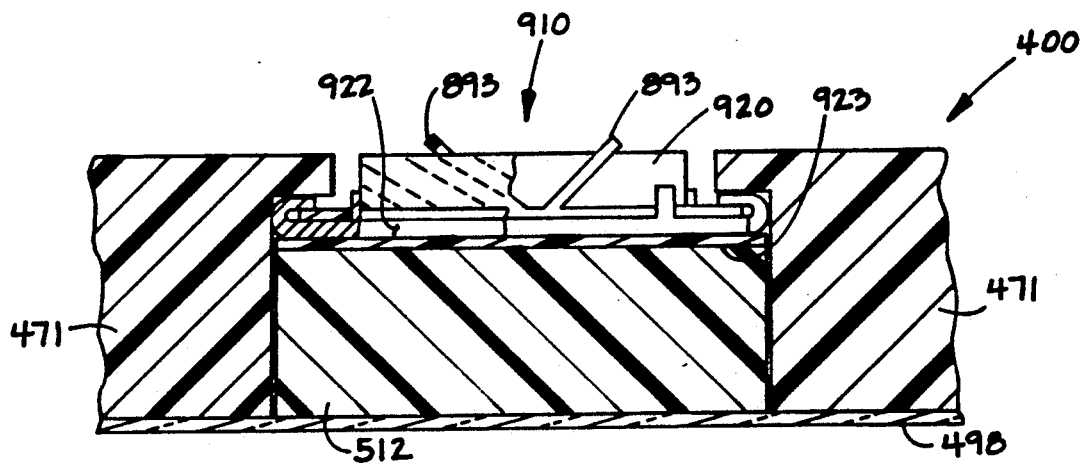
FIG. 92 is a sectional view showing a mounting assembly which incorporates the structure of FIG. 91 within the dosimenter badge of FIG. 30.

FIG. 92 shows the assembly 910 mounted within dosimeter badge 400 supported by support block 512 as was described above. The central opening 902 of the lower retainer 900 provides an intervening space 922 beneath the dosimeter chip to minimize heat transfer from the dosimeter when heated by a laser during reading. A reflective layer 923 similar to layer 881 described above can also be used also for minimizing heat transfer and improving detectible emission from the dosimeter.

Figure 93:
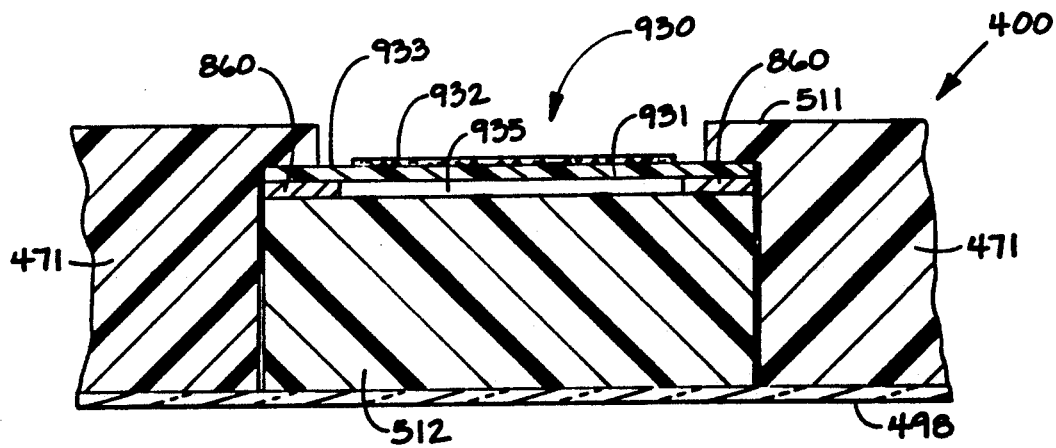
FIG. 93 is a sectional view of a mounting assembly which incorporates a further novel dosimeter in accordance with this invention as assembled in the dosimeter badge of FIG. 30.

FIG. 93 shows another novel dosimeter 930 according to this invention, mounted in dosimeter badge 400 using a preferred mounting arrangement. Dosimeter 930 includes a thin film substrate layer 931 which supports a relatively thin phosphor-binder matrix layer. The substrate layer is preferably made of temperature resistant polymer material which is advantageously a synthetic resin polymer, most preferably polyimide. Alternatively, the substrate can be made of the inorganic materials indicated hereinabove, for example the indicated glasses. The polymer substrate materials must be capable of surviving short-term temperatures in the range 300°–400° C. without substantial degradation for the expected life of the dosimeter being made. The substrate layers are preferably in the range of thicknesses indicated hereinabove for inorganic substrates. More preferably, the polymer substrate layers are in the range of 50–500 microns, even more preferably, 100–200 microns. All such substrate layer thicknesses being relevant to locations adjacent the phosphor-binder layer.

The phosphor-binder matrix layer 932 is attached to the thin substrate by the binding action of a binder composition forming a part of the matrix. The binder used in layer 932 is preferably a polymer binder capable of withstanding short-term temperatures in the range 300°–400° C. without substantial degradation for the expected life of the dosimeter being made. Examples of suitable binders include silicones and polyimides. For example, Dow Corning silicones types 96-083, Q1-4939, R6101. Acceptable polyimides include DuPont's Pyralin, and others.

The phosphor material held in the phosphor-binder matrix layer 932 can be of a variety of types, such as indicated above or as otherwise known in the art of thermoluminescent and luminescent phosphors. The phosphor material is prepared to have grain sizes in the desired ranges as explained hereinabove.

The substrate 931 is preferably provided with a means for occluding spurious emissions which can occur in the plastic substrate upon laser heating. This is preferably accomplished by including a coating or other occlusive layer 933 which is positioned to block or substantially attenuate any emission from the substrate as such might be detected by the luminescent emission detector used to read the dosimeters. As shown, the luminescent emission from dosimeter 930 is detected from above and the occlusive layer is similarly above the polymer portion of the substrate. Acceptable types of occlusive layers include coatings of materials such as reflective coatings of metals, in particular aluminum and many others which can be coated to thicknesses of approximately 0.1-10 microns. An advantageous type of occlusive coating is silicon coated to a thickness in the range of approximately 0.1-10 microns. Germanium may also be appropriate for this use. Silicon has the additional advantage of being not only an occlusive layer to reduce of block the spurious emissions, but also function as a nearly transparent layer to the stimulating beam to allow direct heating of the polyimide or other substrate material. For example, a desirable stimulating beam from an infrared laser may have a wavelength of approximately 10 microns. A silicon having a thickness of approximately 0.1-10 microns in thickness is transparent to this wavelength yet opaque to the luminescent emission from the substrate material which occurs at wavelengths in the approximate range of 200-600 nanometers. This structure achieves thermoluminescent emission in a minimum amount of time and with a minimum of laser energy. Utilization of dosimeters of this type for reading by non-laser methods is also desirable.

It is alternatively possible to attenuate or occlude spurious emissions occurring from plastic substrates by including an additive to the substrate material itself when the substrate film is formed. The substrate occlusive material can advantageously absorb light at the wavelength at which the polymer substrate material luminesces under stimulation by the laser beam, hot gas stream or other stimulating energy used to read the dosimeter. Such an alternative form of spurious emission occluder is an absorbing constituent in the polymer substrate layer itself to absorb the wavelength of the spurious emission generated during reading of the dosimeter. An example is finely ground carbon black which is included in amounts sufficient to darken the substrate and prevent significant spurious luminescent emission during laser reading of the dosimeter.

This invention also includes the discovery that certain types of silicone fluids can be used as both a viscosity modifier or vehicle, and as a means for reducing spurious emissions which can sometimes occur in the binder. Specifically, the silicone binder described hereinabove can be adapted by adding approximately 10% by weight of an additional silicone fluid, preferably polydimethylsiloxane, such as Dow Corning Type 200 having a rated viscosity of 50 centipoise. The addition of such fluid has the surprising effect of reducing the spurious emissions which can occur in such binder material under certain methods of dosimeter reading.

FIG. 93 shows the dosimeter 930 mounted using a spacer 860 as described above to space the substrate away from the support or mounting block 512 used to hold the dosimeter in position against the flange 511 of the dosimeter badge 400. This provides an insulatory space 935 which extends at least across the back of the dosimeter 930 to the extent of the overlying phosphor-binder layer 932. This edge support technique combined with an insulating space provides superior performance to reduce laser heating time and power input. This mounting structure combined with the relatively lower thermal conductivity of the plastic substrate provides particularly advantageous laser heating times and low power input requirements.

The novel polymer dosimeters of this invention are preferably made using novel processes which shall now be described. The processes include selecting a suitable phosphor material for the desired dosimeter application involved. The phosphor material can be selected and prepared from a large variety of available phosphors, such as indicated hereinabove for inorganic binder and substrate dosimeters. A suitable binder composition is also selected. The binder used in the polymeric dosimeters is advantageously also polymeric as indicated above in the description of dosimeter 930. The binder is preferably a liquid which can serve the dual function of acting as the binder in the cured phosphor-binder matrix layer 932, and also act as a vehicle for printing the dosimeter layer onto the substrate 931. The binder can be assisted in this regard by the addition of suitable liquid vehicles such as a solvent, for example a reagent grade of xylenes. Other appropriate solvents will also likely be usable dependent upon the type of binder composition being used.

The selected phosphor material and binder composition are mixed to form a preferably homogeneous phosphor-binder or phosphor-binder-vehicle mixture. The preferred ratios of phosphor to binder are approximately in the range 10:1 to 1:3 (phosphor:binder). More preferably the phosphor to binder ratios are in the approximate range 5:1 to 1:2, all by weight comparisons.

The phosphor and binder containing mixtures also include any required or desirable curing agent needed to cause the polymeric binder to fully harden. For example, the type 96-083 silicone uses a curing agent also designated 96-083 which is mixed with the silicone base to cause the base to cure and harden, preferably with the addition of heat. The phosphor and binder containing mixtures have a desired consistency ranging from liquid to plastically deformable, thereby allowing the mixtures to be applied to a selected substrate in such consistencies.

Figure 94A:
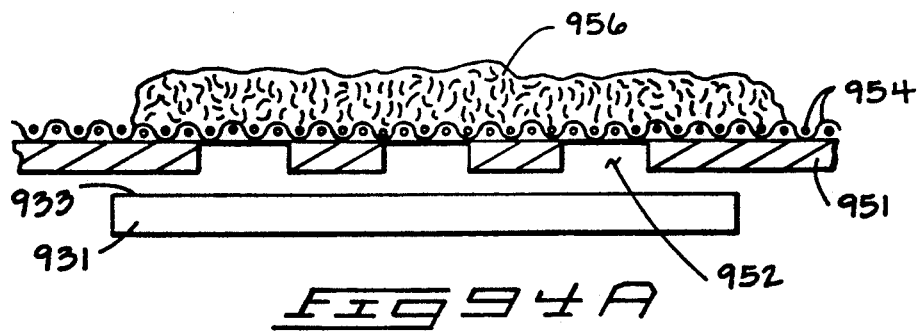
FIG. 94A–94C show a preferred procedure for producing dosimeters such as the dosimeter shown in FIG. 93.
Figure 94B:
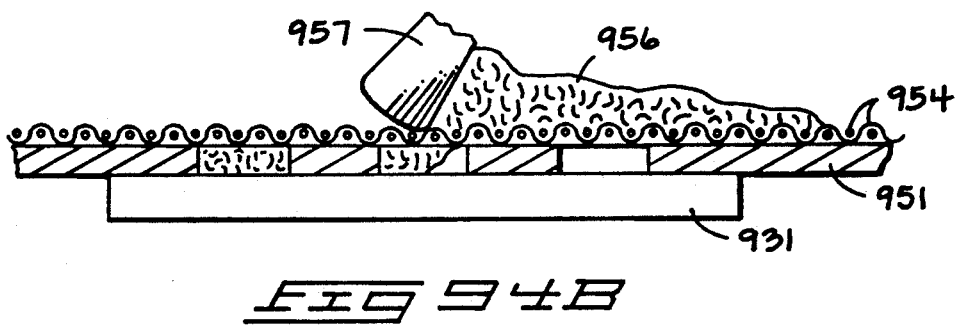
Figure 94C:
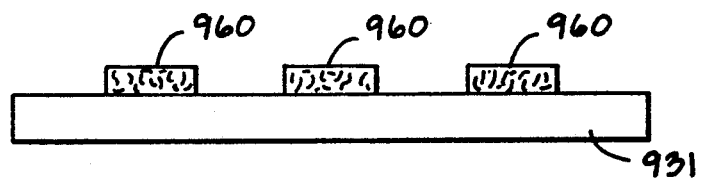

The novel methods also advantageously include applying the phosphor-binder mixtures to the substrate. This is most preferably accomplished using a printing technique, particularly a screen printing procedure. FIGS. 94A-94C illustrate the procedure used in the preferred polymeric binder dosimeter printing processes according to this invention. The substrate 931 with applied occlusive coating 933 is positioned for application of the phosphor-binder mixture. A mask 951 having openings 952 is positioned upon the surface of the substrate to which the phosphor-binder layer is being applied. A screen 954 is advantageously used to control deposition of the phosphor-binder or phosphor-binder-vehicle mixture 956. A utensil 957 is advantageously used to force the mixture through the screen 954 and into the openings 952, as shown in FIG. 94B. Thereafter the mask and screen are removed from the substrate leaving formed phosphor-binder layers 960. The applied phosphor-binder layers can then be appropriately cured to harden the mixture into a securely affixed composite with the substrate.

The curing procedure will vary dependent upon the specific type of binder used. Where any solvents or other vehicle are present either in the bind composition as purchased or mixed, then it may be desirable to degas the applied phosphor-binder layers to remove any residual gas bubbles in the layer and to remove such solvents or other vehicles from the dosimeters. This degassing can be accomplished by applying a vacuum pressure to the dosimeter array for sufficient amount of time, for example 10-60 minutes. The curing also preferably includes other steps as appropriate to produce desired mechanical properties. In the case of type 96-083 silicone binder, the curing is advantageously accomplished using elevated temperature of approximately 150°–200° C. to harden the phosphor-binder layers. In the case of polyimide binder compositions a heating regime at temperatures of 100°, 200°, and 300° C. for one (1) hour at each temperature is advantageously employed. Other appropriate curing procedures specific to the binder used may also be employed.

Figure 95:
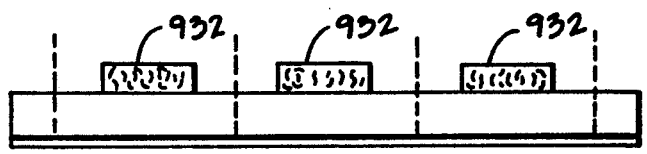
FIG. 95 shows cured dosimeters from the process of FIGS. 94A-C being divided.
Figure 96:
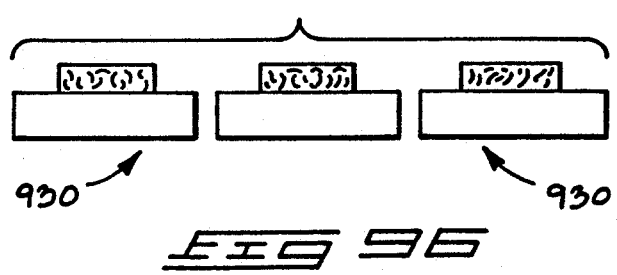
FIG. 96 shows finished dosimeters after processing as shown in FIGS. 94A-C and 95.

After the substrates with applied phosphor-binder layers 932 have been cured, then they are ready for cutting into individual dosimeters, as shown in FIG. 95 and 96. The substrate can be cut using any appropriate procedure, such as by shearing. The resulting dosimeters 930 can then be mounted as explained above, or as otherwise is appropriate.

The procedures explained above using polymeric binder compositions can also be modified to allow application of the binder without previous admixture of the phosphor, followed by depositing the particulate phosphor onto the uncured deposits of binder. Excess phosphor can be removed either before or after curing. The binder and applied phosphor particular are cured as indicated above and are bound together with the phosphor material concentrated along the upper surface of the resulting phosphor-binder layer.

The procedures explained above can also be used to apply phospor-binder layers containing polymeric binder compositions to inorganic substrates, such as glass beryllium oxide and others as set forth more completely elsewhere in this application. The procedures vary significantly only with respect to the selection of the substrate material. In the case of glass subtrates the thickness is preferably somewhat thinner than for polymeric substrates because of the higher thermal conductivity of glass.

EXAMPLE 14

Kapton (Dupont brand polyimide) film was used for preparing dosimeter substrates. Substrate layers of 5 mil thickness were prepared by cutting the film with a paper cutter into 3" by 3" squares. These squares were then cleaned with reagent grade acetone and lightly dried with a lint free cloth. Thereafter the substrate squares were placed in a 300° C. oven for 10 to 30 minutes to fully drive off the residual solvent and moisture. Calcium sulfate doped with thulium ($CaSO_4$:Tm), grain size 20–40 microns, was selected as the phosphor material. A two-part, self-priming silicone, Dow Corning type 96-083 was selected to serve as both the printing vehicle and binder. Four (4) grams of the phosphor was added to 2.284 grams 96-083 silicone base and 0.228 grams 96-083 curing agent. This was then thoroughly mixed. The mixture was then printed onto the prepared Kapton substrate using the novel dosimeter printing techniques described above in connection with FIG. 94A–C. The screen used for this purpose was 230 mesh with 1.4 mil stainless steel wires and a 0.5 mil mask coating. The mask defined a 12×12 array of 2.7 mm×2.7 mm openings evenly spaced on 0.25" centers. Application of the mixture therefore produced a corresponding array of discreet squares of wet phosphor-silicone mixture on the 3"×3" substrate. This was put in a vaccum of approximately 28" of mercury for 15 minutes to remove any entrapped air from the silicone. The degassed array was then placed in an over at 200° C. for an hour to cure the silicone to a hard rubber consistency. The cured phosphor-binder layer provided fully encapsulated phosphor grains. Each resulting dosimeter array sheet was then cut into 144 individual 0.25"×0.25" pieces with the printed squares centered on each.

EXAMPLE 15

A 100 micron this Upilex (UBE Corp. polyimide film) substrate was obtained and printed elements were prepared with it as in Example 14.

EXAMPLE 16

Kapton substrate material having a thickness of approximately 125 microns was obtained from Sheldahl Inc. with a 0.1 micron aluminum coating vacuum vapor deposited on one surface. The aluminized surface was clean enough to allow use without further cleaning prior to application of the phosphor-binder mixture. Printed dosimeter elements were prepared with this substrate as in Example 14. The aluminum layer acted as an occlusive layer to reduce spurious luminescent output orginating from the substrate material.

EXAMPLE 17

Kapton substrate material having a thickness of approximately 125 microns was obtained from Andus Corp. with a 0.1 micron aluminum coating sputtered onto one surface. Printed elements were prepared with this substrate as in Example 14.

EXAMPLE 18

The same procedure of Example 14 was followed using magnesium borate doped with thullium ($MgB_4O_7$:Tm ). This was done with 0.25 grams phosphor added to 0.571 grams silicone base and 0.057 grams curing agent. The phosphor grain size was generally in the range 40–90 microns. The screen was 80 mesh with 2.0 mil wires and a 2.0 mil mask coating.

EXAMPLE 19

A substrate as explained in Example 16 was used to prepare dosimeter elements as in Example 18.

EXAMPLE 20

A substrate as explained in Example 17 was used to prepare dosimeter elements as in Example 18.

In compliance with the statue, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims appropriately interpreted in accordance with the doctrine of equivalents.

We claim:

1. A radiation dosimeter badge having at least a first part and a second part; at least one of said parts including a dosimeter holder for holding at least one luminescent dosimeter; said first and second parts being controllably detachable using a rotatable mechanical connection;

a tamper-resistance means to controllably resist unauthorized detachment of the first and second parts of the dosimeter badge; said tamper-resistance means including a tamper ring which engages to resist movement of a rotatable locking ring which is movable to controllably restrain the second and first parts of the dosimeter badge.

2. A radiation dosimeter badge in accordance with claim 1 wherein the tamper ring is biased to engage with the rotatable locking ring.

3. A radiation dosimeter badge having at least:
a first part;
a second part;
at least one of said first and second parts including a dosimeter holder for holding at least one luminescent dosimeter;
at least one locking member which is movably mounted to the first part; said locking member being a rotatable locking ring mounted for controllable movement between at least one restraining position and at least one releasing position to controllably secure together and release the first and second parts, respectively; said locking member including locking projections which engage with portions of the second part to force the first and second parts into sealing engagement;
sealing means for sealing between mating portions of the first and second parts;
a tamper-resistance means; said tamper-resistance means including a tamper ring which engages to resist movement of the locking member.

4. A radiation dosimeter badge in accordance with claim 3 wherein the badge includes measns for allowing engagement of the tamper ring with a release tool.

5. A dosimeter mounting for holding at least one luminescent dosimeter, comprising:
a first dosimeter retainer;
a second dosimeter retainer;
said first and second dosimeter retainers being formed to engage a luminescent dosimeter about limited portions of the outer periphery of the luminescent dosimeter;
at least one of said retainers being formed to space the luminescent dosimeter away from an adjacent portion of a luminescent dosimeter badge to reduce heat transfer between the dosimeter and the supporting dosimeter badge;
wherein the first dosimeter retainer is a layer of temperature-resistant synthetic polymer resin and the second dosimeter retainer includes a plurality of metallic restraint bands which hold and restrain the dosimeter of the first dosimeter retainer.

6. A dosimeter mounting for holding at least one luminescent dosimeter, comprising:
a first dosimeter retainer;
a second dosimeter retainer;
said first and second dosimeter retainers being formed to engage a luminescent dosimeter about limited portions of the outer periphery of the luminescent dosimeter;
at least one of said retainers being formed to space the luminescent dosimeter away from an adjacent portion of a luminescent dosimeter badge to reduce heat transfer between the dosimeter and the supporting dosimeter badge;
wherein said first retainer member includes prongs which extend to laterally restrain the dosimeter in opposing directions along a first line of lateral action, and said second retainer member includes a deformable array of restraint elements which extend across the dosimeter face to restrain outward motion and along opposing sides of the dosimeter to restrain lateral motion along a second line of lateral action which is approximately perpendicular to said first line of lateral action, when the first and second retainer members are installed upon the dosimeter.

7. A dosimeter mounting according to claim 6 and wherein at least one of said first or second retainer members includes assembly prongs for deformably engaging about a retainer member to secure the first and second retainer members together in an assembly with a luminescent dosimeter held therebetween.

8. A method for producing a laser readable radiation dosimeter capable of withstanding relatively high temperature gradients and short-term temperatures in the range of 300°–400° C., comprising :
selecting at least one particulate luminescent phosphor composition containing at least some luminescent phosphor material;
selecting at least one synthetic polymer binder composition having an ability to withstand short-term heating in the range of 300°–400° C.;
mixing the selected phosphor composition and synthetic polymer binder composition to a form a phosphor-binder mixture which ranges in consistency from being fluid to plastically deformable;
selecting a suitable substrate having a thickness of approximately 1000 microns or less adjacent to luminescent phosphr layer locations;
positioning a mask having mask openings therethrough adjacent the substrate with the mask openings located at desired luminescent phosphor layer locations;
depositing the phosphor-binder mixture through the mask openings and onto the substrate to form phosphor-binder deposits thereon;
curing the substrate and deposited phospor-binder deposits to harden and secure the phosphor-binder deposits upon the substrate.

9. A method according to claim 8 wherein said curing is accomplished by heating.

10. A method according to claim 8 wherein said curing is accomplished by heating to temperatures of approximately 150° C. or greater.

11. A method according to claim 8 wherein said selecting particulate luminescent phosphor composition includes selecting particles generally less than 100 microns in size.

12. A method according to claim 8 wherein said synthetic polymer binder is a fluid when mixed with the particulate luminescent phosphor composition.

13. A method according to claim 8 wherein ratios of luminescent phosphor material to synthetic polymer binder in the phosphor-binder mixture are approximately in the range of 10:1 to 1:3 on the basis of weight of mixed constituents.

14. A method according to claim 8 and further defined to include overlaying the phosphor-binder deposits with a synthetic polymer binder to seal and protect said deposits.

15. A method according to claim 8 and further defined by:
selecting a suitable liquid vechile; and
wherein said mixing further comprises mixing the selected liquid vehicle with the selected phosphor composition and synthetic polymer binder to form a phosphor-binder-vehicle mixture whixh is used in said depositing to form said phosphor-binder deposits.

16. A method according to claim 8 wherein said selecting at least one synthetic polymer binder composition is defined to include selecting binder composition which includes at least some suitable polyimide.

17. A method according to claim 8 wherein said selecting at least one synthetic polymer binder composition is defined to include selecting a binder composition which includes at least some suitable silicone.

18. A method for producing a laser readable radiation dosimeter, comprising:
    selecting at least one particulate luminescent phosphor composition containing at least some luminescent phosphor material;
    selecting at least one fluid binder composition;
    mixing the selected phosphor composition and binder composition to form a phosphor-binder mixture which ranges in consistency from being fluid to plastically deformable;
    selecting a suitable substrate having a thickness of approximately 1000 microns or less adjacent to luminescent phosphor layer locations;
    positioning a mask having mask openings therethrough adjacent the substrate with the mask openings located at desired luminescent phosphor layer locations;
    depositing the phosphor-binder mixture through the mask openings and onto the substrate to form phospor-binder deposits thereon;
    curing the deposited phosphor-binder deposits to harden and secure the phosphor-binder deposits upon the substrate.

19. A method for producing a laser readable radiation dosimeter, comprising:
    selecting at least one particulate luminescent phosphor composition containing at least some luminescent phosphor material;
    selecting at least one binder composition;
    selecting at least one fluid vehicle composition;
    mixing the selected phosphor composition, binder composition, and vehicle composition to form a phosphor-binder-vehicle mixture which ranges in consistency fromm being fluid to plastically deformable;
    selecting a suitable substrate having a thickness of approximately 1000 microns or less adjacent to luminescent phospher layer locations;
    positioning a mask having mask openings therethrough adjacent the substrate with the mask opening located at desired luminescent phosphor layer locations;
    despositing the phosphor-binder-vehicle mixture through the mask openings and onto the substrate to form phosphor-binder deposits thereon;
    curing the deposited phosphor-binder desposits to harden and secure the phosphor-binder deposits upon the substrate.

20. A method for producing a laser readable radiation dosimeter, comprising:
    selecting at least one particulate luminescent phoshor composition contaning at least some luminescent phosphor material;
    selecting at least one binder composition;
    selecting at least one fluid vehicle composition;
    mixing the selected binder composition and vehicle composition to form a binder-vehicle mixture which ranges in consistency from being fluid to plastically deformable;
    selecting a suitable substrate having a thickness of approximately 1000 microns or less adjacent to luminescent phosphor layer locations;
    positioning a mask having mask openings therethrough adjacent the substrate with the mask openings located at desired luminescent phosphor layer locations;
    despositing the binder-vehicle mixture through the mask openings and onto the substrate to form binder-vehicle desposits thereon;
    despositing selected particulate luminescent phosphor composition onto desposited binder-vehicle deposits to form phospher-binder-vehicle deposits;
    curing the deposited phosphor-binder-vehicle deposits to harden and secure phosphor-binder deposits upon the substrate.

21. A method according to claim 20 wherein said curing is accomplished by heating.

22. A method according to claim 20 wherein said curing is accomplished by heating to temperatures of approximately 150° C. or greater.

23. A method according to claim 20 wherein said selecting particulate luminescent phosphor composition includes selecting particles generally less than 100 microns in size.

24. A method according to claim 20 wherein ratios of luminescent phosphor material to synthetic polymer binder in the phosphor-binder mixture are approximately in the range of 10:1 to 1:3 on the basis of weight of mixed constituents.

25. A process for opening a tamper-resistant dosimeter badge, comprising:
    inserting at least one tool into tamper element apertures formed in the dosimeter badge;
    despressing at least one tamper-resistent element using said tool to remove the tamper-resistant element from a locking ring of the dosimeter badge;
    rotating said locking ring to release at least one portion of the dosimeter badge and allow removed thereof.

26. A radiation dosimeter badge comprising:
    a first part having an outer perimeter which is asymmetically shaped to uniquely identify the orientation of the first part;
    a second part asymmetrically shaped to engage with the first part in a unique orientation with respect to the first part;
    a plurality of dosimeter elements mounted to the second part in a desired arrangement;
    said first and second parts being connectible together and detachable to allow separation of the second part from the first part for reading in a dosimeter handling machine;
    at least one locking element movably mounted to said first part and movable between a locking position wherein at least one locking element engages the second part and retains it to the first part, and a releasing position wherein the second part is free for detachment from the first part.

27. A dosimeter according to claim 26 wherein the second part is received within a receptacle formed in the first part.

28. A dosimeter according to claim 26 wherein the second part is a disk shaped piece received within a receptacle formed in the first part; and said locking element is an arcuate member mounted for arcuate slidable movement relative to said first part.

29. A dosimeter according to claim 26 wherein the second part is a disk shaped piece received within a receptacle formed in the first part; and said locking element is a ring member mounted for arcuate slidable movement relative to said first part.

30. A dosimeter according to claim 26 wherein the second part is a piece having a plurality sized perimeter segments received within a receptacle formed in the first part with corresponding sections which receive the perimeter segments.

31. A dosimeter according to claim 26 wherein the second part is a piece having a plurality of differing projections received within a receptacle formed in the first part; said differing projections being engaged by the locking element at a plurality of locations about the second part to secure the second to the first part.

32. A dosimeter according to claim 26 and further comprising at least one tamper-resistant member which engages and restrains the locking member when the locking member is in the locking position.

33. A dosimeter according to claim 26 wherein the second part is a disk shaped piece received within a receptacle formed in the first part; and said locking element is an arcuate member mounted for arcuate slidable movement relative to said first part; and further comprising a tamper-resistant member which engages and restrains the locking member when the locking member is in the locking position.

34. A dosimeter badge comprising:
a first part;
a second part;
at least one dosimeter holder mounted to at least one of said first or second parts for holding at least one dosimeter;
a seal for sealing between the first and second parts to form a sealed dosimeter enclosure;
at least one locking member which is slidably mounted to the first part and movable between at least one locking position and at least one releasing position; said locking member engaging the second part at a plurality of positions in the one locking position to controllably secure the first and second parts together in a sealed relationship; said locking member releasing the second part in the at least one releasing position to allow separation of the second part from the first part; wherein the locking member is mounted for arcuate slidable movement relative to the first part.

35. A dosimeter being according to claim 34 wherein the locking member is a ring member mounted for arcuate slidable movement relative to the first part.

36. A dosimeter badge according to claim 34 and further comprising at least one tamper-resistant member which engages and restrains the locking member when the locking member is in the at least one locking position.

37. A dosimeter badge according to claim 34 wherein the locking member is a ring member mounted for arcuate slidable movement relative to the first part; and further comprising at least one tamper-resistant member which engages and restrains the locking member when the locking member is in the at least one locking position.

38. A luminescent dosimeter capable of withstanding relatively high temperature gradients and short-term temperatures in the range of 300°-400° C., made according to the process comprising:

selecting at least one particulate luminescent phosphor composition containing at least some luminescent phosphor material;
selecting at least one synthetic polymer binder composition having an ability to withstand short-term heating in the range of 300°-400° C.;
mixing the selected phosphor composition and synthetic polymer binder composition to form a phosphor-binder mixture ranges in consistency from being fluid to plastically deformable; approximately
selecting a suitable substrate having a thickness of 1000 microns or less adjacent to luminescent phosphor layer locations;
positioning a mask having mask openings therethrough adjacent the substrate with the mask openings located at desired luminescent phosphor layer locations;
depositing the phosphor-binder mixture through the mask openings and onto the substrate to form phosphor-binder desposits thereon;
curing the substrate and deposited phosphor-binder deposits to harden and secure the phosphor-binder deposits upon the substrate.

39. A luminescent dosimeter according to claim 38 wherein said curing is accomplished by heating.

40. A luminescent dosimeter according to claim 38 wherein said curing is accomplished by heating to temperatures of approximately 150° C. or greater.

41. A luminescent dosimeter according to claim 38 wherein said selecting at least one particulate luminescent phosphor composition includes selecting particles generally less than 100 microns in size.

42. A luminescent dosimeter according to claim 38 wherein said at least one synthetic polymer binder composition is a fluid when mixed with the particulate luminescent phosphor composition.

43. A luminescent dosimeter according to claim 38 wherein ratios of luminescent phosphor material to synthetic polymer binder the phosphor-binder mixture are approximately in the range of 10:1 to 1:3 on the basis of weight of mixed constituents.

44. A luminescent dosimeter according to claim 38 and further defined to include overlaying the phosphor-binder deposits with a synthetic polymer binder to seal and protect said deposits.

45. A luminescent dosimeter according to claim 38 and further defined by:
selecting a suitable liquid vehicle; and
wherein said mixing further comprises mixing the selected liquid vehicle with the selected phosphor composition and synthetic polymer binder to form a phosphor-binder-vehicle mixture which is used in said depositing to form said phosphor-binder deposits.

46. A luminescent dosimeter according to claim 38 wherein said selecting at least one synthetic polymer binder composition is defined to include selecting a binder composition which includes at least some suitable polyimide.

47. A luminescent dosimeter according to claim 38 wherein said selecting at least one synthetic polymer binder composition is defined to include selecting a binder composition which includes at least some suitable silicone.

48. A luminescent dosimeter according to the process comprising:

selecting at least one particulate luminescent phosphor composition containing at least some luminescent phosphor material;

selecting at least one fluid binder composition;

mixing the selected phosphor composition and binder composition to form a phosphor-binder mixture which ranges in consistency from being fluid to plastically deformable;

selecting a suitable substrate having a thickness of approximately 1000 microns or less adjacent to luminescent phosphor locations;

positioning a mask having mask openings therethrough adjacent the substrate with the mask openings located at desired luminescent phosphor layer locations;

depositing the phosphor-binder mixture through the mask openings and onto the substrate to form phosphor-binder deposits thereon;

curing the desposited phosphor-binder desposits to harden and secure the phosphor-binder deposits upon the substrate.

49. A luminescent dosimeter made according to the process comprising:

selecting at least one particulate luminescent phosphor composition containing at least some luminescent phosphor material;

selecting at least one binder composition;

selecting at least one fluid vehicle composition;

mixing the selected phosphor composition, binder composition, and vehicle composition to form a phosphor-binder-vehicle mixture which ranges in consistency from being fluid to plastically deformable;

selecting a suitable substrate having a thickness of approximately 1000 microns or less adjacent to luminescent phosphor layer locations;

positioning a mask having mask openings therethrough adjacent the substrate with the mask openings located at desired luminescent phosphor layer locations;

despositing the phosphor-binder-vehicle mixture through the mask openings and onto the substrate to form phosphor-binder desposits thereon;

curing the deposited phosphor-binder desposits to harden and secure the phosphor-binder desposits upon the substrate.

50. A luminescent dosimeter made according to the process comprising:

selecting at least one particulate luminescent phosphor composition containing at least some luminescent phosphor material;

selecting at least one binder comprising;

selecting at least one fluid vehicle composition;

mixing the selected binder composition and vehicle composition to form a binder-vehicle mixture which ranges in consistency from being fluid to plastically deformable;

selecting a suitable substrate having a thickness of approximately 1000 microns or less adjacent to luminescent phosphor layer locations;

positioning a mask having mask openings therethrough adjacent the substrate with the mask openings located at desired luminescent phosphor layer locations;

despositing the binder-vehicle mixture through the mask openings and onto the substrate to form binder-vehicle desposits thereon;

despositing selected particulate luminescent phosphor composition onto deposited binder-vehicle deposits to form phosphor-binder-vehicle deposits;

curing the deposited phosphor-binder-vehicle deposits to harden and secure phosphor-binder deposits upon the substrate.

51. A luminescent dosimeter according to claim 50 wherein said curing is accomplished by heating.

52. A luminescent dosimeter according to claim 50 wherein said curing is accomplished by heating to temperatures of approximately 150° C. or greater.

53. A luminescent dosimeter according to claim 50 wherein said selecting at least one phosphor luminescent phosphor composition includes selecting particles generally less than 100 microns in size.

54. A luminescent dosimeter according to claim 50 wherin ratios of luminescent phosphor material to synthetic polymer binder in the phosphor-binder mixture are approximately in the range of 10:1 to 1:3 on the basis of weight of mixed constituents.

* * * * *